United States Patent
Hanuschak

(10) Patent No.: US 12,546,108 B2
(45) Date of Patent: Feb. 10, 2026

(54) MOUNTING HARDWARE FOR CEILING SYSTEM

(71) Applicant: ARMSTRONG WORLD INDUSTRIES, INC., Lancaster, PA (US)

(72) Inventor: Ryan D. Hanuschak, Lancaster, PA (US)

(73) Assignee: AWI Licensing LLC, Wilmington, DE (US)

( * ) Notice: Subject to any disclaimer, the term of this patent is extended or adjusted under 35 U.S.C. 154(b) by 206 days.

(21) Appl. No.: 18/420,497

(22) Filed: Jan. 23, 2024

(65) Prior Publication Data

US 2024/0247485 A1    Jul. 25, 2024

Related U.S. Application Data

(60) Provisional application No. 63/440,478, filed on Jan. 23, 2023.

(51) Int. Cl.
| | |
|---|---|
| *E04B 9/18* | (2006.01) |
| *E04B 9/04* | (2006.01) |
| *E04B 9/34* | (2006.01) |

(52) U.S. Cl.
CPC .............. *E04B 9/18* (2013.01); *E04B 9/04* (2013.01); *E04B 9/34* (2013.01)

(58) Field of Classification Search
CPC ................ E04B 9/34; E04B 9/04; E04B 9/18
USPC ........................................................ 52/506.06
See application file for complete search history.

(56) References Cited

U.S. PATENT DOCUMENTS

| | | | | |
|---|---|---|---|---|
| 3,589,660 A | * | 6/1971 | Dunckel | F21V 21/02 |
| | | | | 52/39 |
| 3,612,461 A | * | 10/1971 | Brown | E04B 9/18 |
| | | | | 52/506.07 |
| 4,610,562 A | * | 9/1986 | Dunn | F16B 7/0486 |
| | | | | 403/233 |
| 4,726,165 A | * | 2/1988 | Brinsa | E04B 9/26 |
| | | | | 52/713 |
| 5,069,014 A | | 12/1991 | Kubbutat | |
| 5,667,181 A | | 9/1997 | van Leeuwen | |
| 5,822,941 A | * | 10/1998 | Kinsella | E04B 9/28 |
| | | | | 52/712 |
| 6,279,286 B1 | * | 8/2001 | Ichihashi | E04F 13/0826 |
| | | | | 52/489.1 |
| 7,896,601 B2 | * | 3/2011 | Kalyanadurga | F16B 21/084 |
| | | | | 411/510 |

(Continued)

FOREIGN PATENT DOCUMENTS

WO     WO 2014/107437 A1     7/2014

*Primary Examiner* — Paola Agudelo
(74) *Attorney, Agent, or Firm* — Patrick Sheldrake

(57) ABSTRACT

Described herein is a mounting clip comprising a mounting flange comprising a top surface opposite a bottom surface and a perimeter extending between the top surface and the bottom surface, a positioning member extending upwards from the mounting flange, a grid engagement member extending upwards from the positioning member, a first alignment tab extending downward from the mounting flange, and wherein the mounting flange comprises a keyhole located inset from the perimeter of the mounting flange and extending continuously from the top surface to the bottom surface of the mounting flange.

20 Claims, 27 Drawing Sheets

(56) References Cited

U.S. PATENT DOCUMENTS

| | | | |
|---|---|---|---|
| 7,955,038 B2 | 6/2011 | Silbereisen | |
| 8,109,482 B2* | 2/2012 | Oh | A62C 35/68 |
| | | | 248/62 |
| 8,136,311 B2* | 3/2012 | Liu | F24S 25/61 |
| | | | 52/173.3 |
| 8,584,421 B2 | 11/2013 | Norton | |
| 8,782,985 B2* | 7/2014 | Gulbrandsen | E04B 9/30 |
| | | | 52/506.07 |
| 8,955,272 B1* | 2/2015 | Underkofler | E04B 9/242 |
| | | | 52/220.6 |
| 9,086,086 B2 | 7/2015 | Bentrim | |
| 9,187,896 B1* | 11/2015 | Bergman | E04B 9/10 |
| 9,376,812 B2* | 6/2016 | Porter | F16B 5/0225 |
| 9,926,957 B2* | 3/2018 | Zhang | F16S 3/02 |
| 9,976,303 B2 | 5/2018 | Gloftis | |
| 10,174,501 B1* | 1/2019 | Underkofler | E04B 9/16 |
| 10,815,662 B1* | 10/2020 | Smith | E04B 9/225 |
| 2009/0126303 A1* | 5/2009 | Ferge | E04D 3/361 |
| | | | 52/410 |
| 2011/0058915 A1 | 3/2011 | Scroggie | |
| 2014/0190109 A1 | 7/2014 | Bergman | |
| 2016/0053489 A1* | 2/2016 | Porter | F16M 13/027 |
| | | | 248/214 |
| 2017/0044767 A1* | 2/2017 | Gloftis | E04B 9/225 |
| 2018/0291622 A1* | 10/2018 | Li | E04B 9/068 |
| 2020/0347595 A1* | 11/2020 | Baxter | E04B 9/225 |

* cited by examiner

MOUNTING HARDWARE FOR CEILING SYSTEM

CROSS-REFERENCE TO RELATED APPLICATIONS

This application claims the benefit of U.S. Provisional Patent Application No. 63/440,478 filed on Jan. 23, 2023. The disclosure of the above application is incorporated herein by reference.

BACKGROUND OF THE INVENTION

One type of ceiling system includes ceiling panels or tiles that are installed in a support grid or grille which may be suspended from or directly installed to a suitable overhead building support structure. Such ceiling systems may be designed to partially or completely conceal the support grid from view but may be difficult to install uniformly. Therefore, an improved mounting hardware to be used to improve use installation.

SUMMARY OF THE INVENTION

The present invention provides a mounting clip comprising: a mounting flange comprising a top surface opposite a bottom surface and a perimeter extending between the top surface and the bottom surface; a positioning member extending upwards from the mounting flange; a grid engagement member extending upwards from the positioning member; a first alignment tab extending downward from the mounting flange; and wherein the mounting flange comprises a keyhole located inset from the perimeter of the mounting flange and extending continuously from the top surface to the bottom surface of the mounting flange.

Other embodiments of the present invention include a mounting clip comprising: a mounting flange comprising: a top surface; a bottom surface that is opposite the top surface; a perimeter extending between the top surface and the bottom surface; a keyhole located inset from the perimeter of the mounting flange and extending continuously from the top surface to the bottom surface of the mounting flange; a first alignment tab extending downward from the mounting flange; a second alignment tab extending downward from the mounting flange; a first axis extending through the keyhole in a direction that is orthogonal to the bottom surface of the mounting flange; and wherein the first alignment tab and the second alignment tab are positioned about the first axis and offset by about 180 degrees as measured about the first axis.

Other embodiments of the present invention include a mounting kit comprising: at least one of the previously recited mounting clips; and a mounting key comprising: a mounting tab having a mounting tab width and a mounting tab length; and a mounting spacer having a mounting spacer diameter; wherein the mounting tab length is greater than the mounting tab width; wherein the mounting tab length is greater than the spacer diameter; and wherein the spacer diameter is equal to or less than the mounting tab width.

Other embodiments of the present invention include a panel assembly comprising a panel comprising a body and having a first major surface opposite a second major surface and a side surface extending there-between; at least one mounting clip comprising: a mounting flange comprising: a top surface opposite a bottom surface and a perimeter extending between the top surface and the bottom surface; a keyhole located inset from the perimeter of the mounting flange and extending continuously from the top surface to the bottom surface of the mounting flange; a positioning member extending upwards from the mounting flange; a grid engagement member extending upwards from the positioning member; a first alignment tab extending downward from the mounting flange; and at least one mounting key comprising: a mounting tab; and a mounting spacer; and wherein the first alignment tab of the mounting clip is located adjacent to the first major surface of the panel; wherein the lower surface of the mounting flange is located is adjacent to the side surface of the panel; wherein the mounting spacer of the mounting key is located at least partially within the keyhole of the mounting flange; and wherein the mounting tab of the mounting key is located adjacent to the top surface of the mounting flange.

Other embodiments of the present invention include a ceiling system comprising at least one support member; the previously discussed panel assembly; wherein the grid engagement member is coupled to the at least one support member such that the panel hangs vertically from the at least one support member via the mounting flange.

Other embodiments of the present invention include a method of assembling a panel assembly comprising: a) providing a mounting clip and a pre-assembled mountable panel, the pre-assembled mountable panel comprising mounting key coupled to a panel, and the mounting clip comprising a mounting flange comprising a keyhole and at least one alignment tab; b) inserting at least a portion of the mounting key through the keyhole of the mounting flange; c) causing rotation of the pre-assembled mountable panel and the mounting clip relative to each other such that the alignment tab contacts the panel; d) driving a secondary fastener thorough the mounting flange and into the panel to secure the mounting clip in place relative to the pre-assembled mountable panel.

BRIEF DESCRIPTION OF THE DRAWINGS

The features of the exemplary embodiments of the present invention will be described with reference to the following drawings, where like elements are labeled similarly, and in which.

Figure 1:
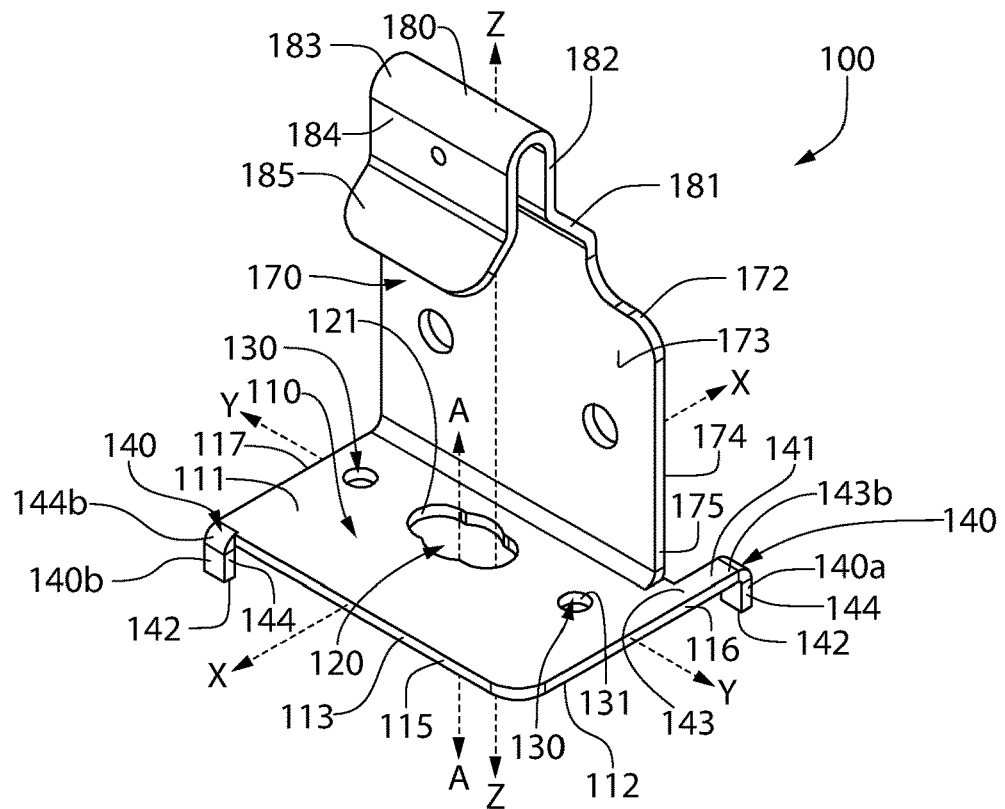
FIG. 1 is a front perspective view of a mounting clip for use in a ceiling system according to the present disclosure.
Figure 2:
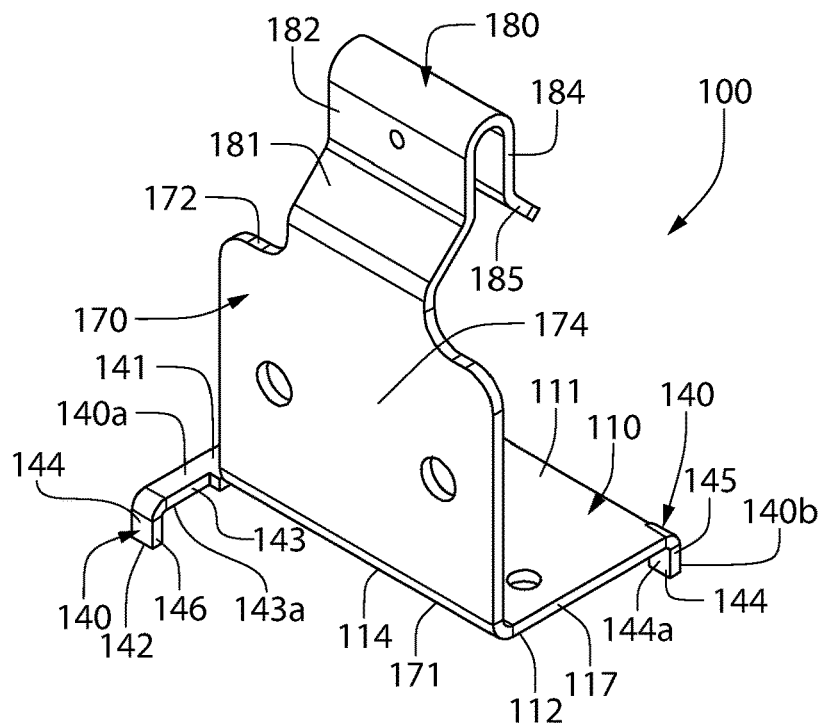
FIG. 2 is a rear perspective view of the mounting clip of FIG. 1.
Figure 3:
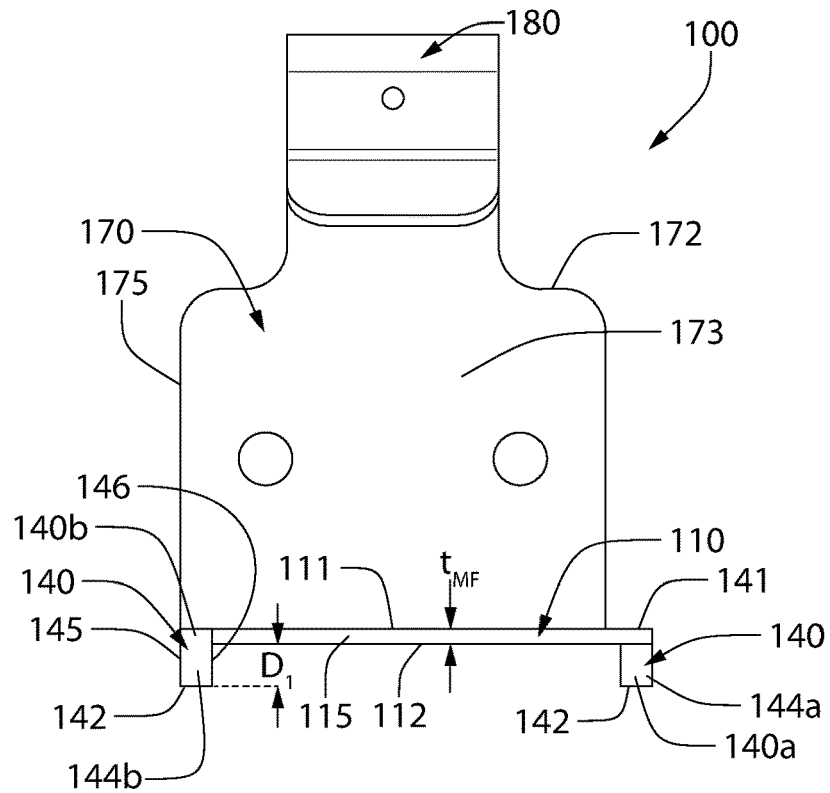
FIG. 3 is a front elevation view of the mounting clip of FIG. 1.
Figure 4:
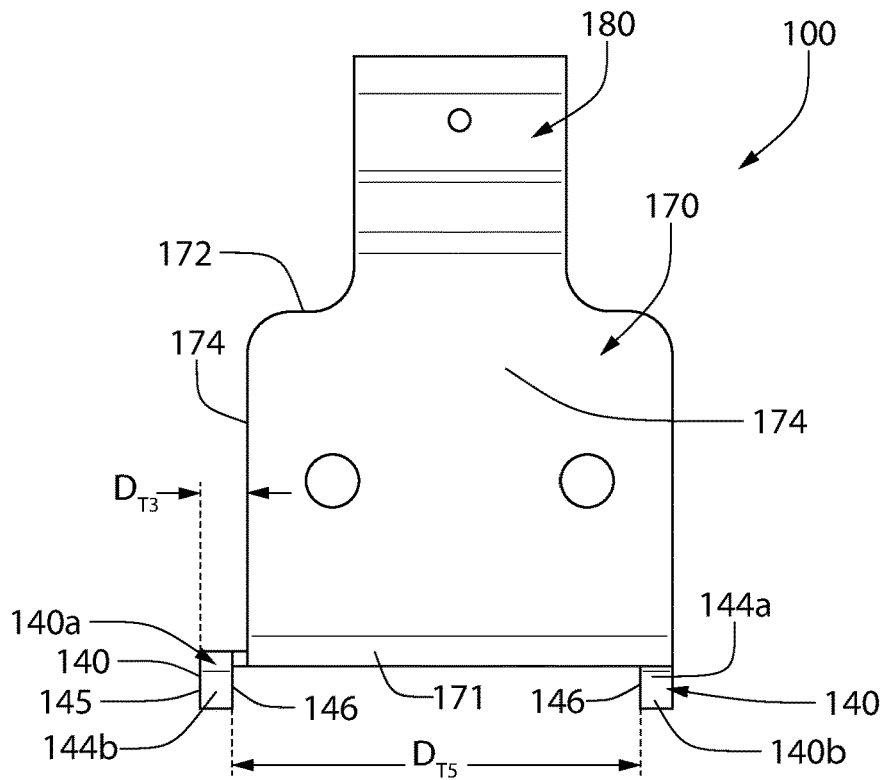
FIG. 4 is a rear elevation view of the mounting clip of FIG. 1.
Figure 5:
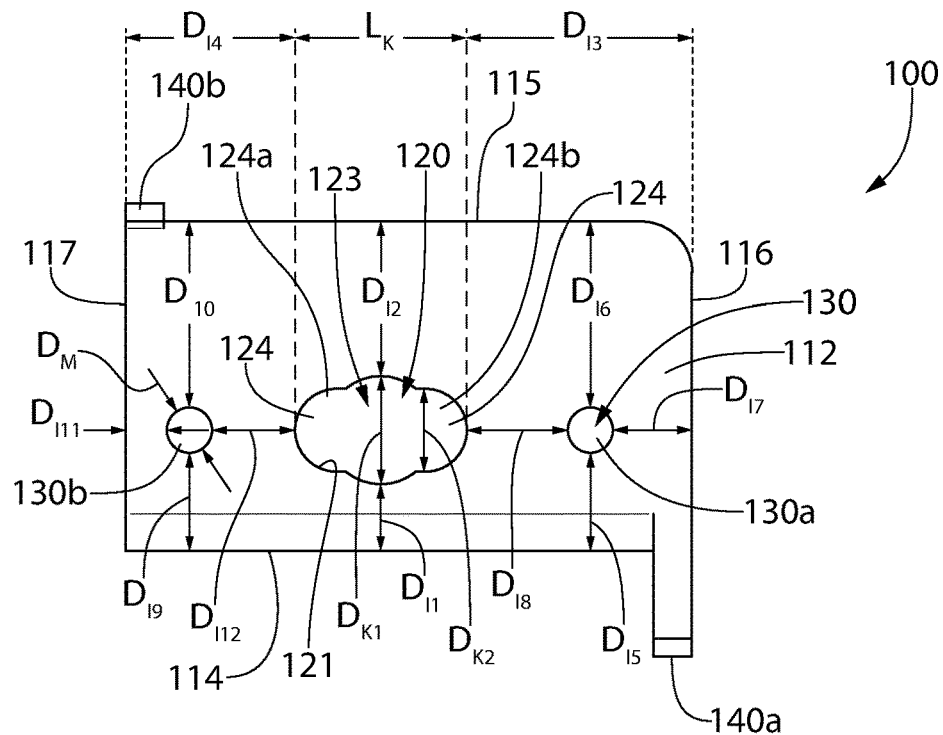
FIG. 5 is a bottom view of the mounting clip of FIG. 1.

All drawings are schematic and not necessarily to scale. Parts given a reference numerical designation in one figure may be considered to be the same parts where they appear in other figures without a numerical designation for brevity unless specifically labeled with a different part number and described herein.

DETAILED DESCRIPTION OF THE EMBODIMENTS

The features and benefits of the invention are illustrated and described herein by reference to exemplary embodiments. The following description of the preferred embodiment(s) is merely exemplary in nature and is in no way intended to limit the invention, its application, or uses.

This description of exemplary embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present invention.

Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Accordingly, the disclosure expressly should not be limited to such exemplary embodiments illustrating some possible non-limiting combination of features that may exist alone or in other combinations of features.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls. According to the present application, the term "about" means +/−5% of the reference value. According to the present application, the term "substantially free" less than about 0.1 wt. % based on the total of the referenced value.

Referring FIGS. 1-6, a mounting clip 100 is described herein. In some embodiments, the mounting clip 100 may be referred to as a "panel mounting clip." In some embodiments, the mounting clip 100 may be referred to as a "slat assembly mounting clip." The mounting clip may be formed of a metal. Non-limiting examples of metals include steel, aluminum, and tin.

The mounting clip 100 may comprise a mounting flange 110. The mounting clip 100 may comprise a positioning member 170. The mounting clip 100 may comprise a grid engagement member 180.

The mounting flange 110 may comprise a top surface 111 opposite a bottom surface 112. The mounting flange 110 may comprise a perimeter 113 that extends between the top surface 111 and the bottom surface 112. The mounting flange 110 may have a thickness $t_{MF}$ as measured by the distance between the top surface 111 and the bottom surface 112. The thickness $t_{MF}$ of the mounting flange 110 may range from about 0.05 inch to about 0.095 inch—including all thickness and sub-ranges there-between.

The perimeter 113 may comprise a first edge 114 opposite a second edge 115. The perimeter may comprise a third edge 116 opposite a fourth edge 117. The first edge 114 may intersect the third edge 116 and the fourth edge 117. The second edge 115 may intersect the third edge 116 and the fourth edge 117. The first edge 114 and the second edge 115 may be substantially parallel. The third edge 116 and the fourth edge 117 may be substantially parallel. The first edge 114 may be substantially orthogonal to the third edge 116 and the fourth edge 117. The second edge 115 may be substantially orthogonal to the third edge 116 and the fourth edge 117.

The mounting clip 100 may be oriented about an X-axis, Y-axis, and Z-axis. The X-axis may intersect the first edge 114 and the second edge 115 of the perimeter 113 of the mounting flange 110. The Y-axis may intersect the third edge 116 and the fourth edge 117 of the perimeter 113 of the mounting flange 110. The Z-axis may intersect the top surface 111 and the bottom surface 112 of the mounting flange 110. The Z-axis and the first axis A-A may be parallel.

The mounting flange 110 may extend along a plane that is parallel to or coplanar with a plane formed by the X-axis and Y-Axis. The positioning member 170 may extend along a plane that parallel to or coplanar with a plane formed by Y-axis and Z-axis.

The positioning member 170 may comprise a lower edge 171 opposite an upper edge 172. The positioning member may comprise a first major surface 173 opposite a second major surface 174. The first major surface 173 and the second major surface 174 of the positioning member may be substantially parallel. The first major surface 173 may extend vertically between the lower edge 171 and the upper edge 172. The second major surface 174 may extend vertically between the lower edge 171 and the upper edge 172. The positioning member 170 may comprise a side surface 175. The side surface 175 may extend vertically between the lower edge 171 and the upper edge 172 as well as extend horizontally between the first major surface 173 and the second major surface 174.

The positioning member 170 may extend upwards from the mounting flange 110. The lower edge 171 of the positioning member 170 may be located adjacent to the mounting flange 110, whereby the positioning member 170 extends upwards from the lower edge 171 to the upper edge 172.

The positioning member 170 may be oriented substantially orthogonal to the mounting flange 110. The first major surface 173 of the positioning member 170 may be substantially orthogonal to the top surface 111 of the mounting flange 110. The first major surface 173 of the positioning member 170 may be substantially orthogonal to the bottom surface 112 of the mounting flange 110.

The grid engagement member 180 may extend updates from the positioning member 170. The grid engagement member 180 may extend upwards from the upper edge 172 of the positioning member 170. The grid engagement member 170 may be a hanger, hook, or the like. The grid engagement member 180 may extend from a proximal end 187 and terminate at a distal end 186. The proximal end 187 of the grid engagement member may extend from the upper edge 172 of the positioning member 170. The distal end 186 of the grid engagement member 180 may overlap the mounting flange 110 along the Z-axis.

The grid engagement member 180 may comprise a first offset portion 181, a rear arm 182, a clip portion 183, a front arm 184, and a second offset portion 185. The distal end 186 may be located on the second offset portion 185. The proximal end 185 may be located on the first offset portion 181.

Figure 37:
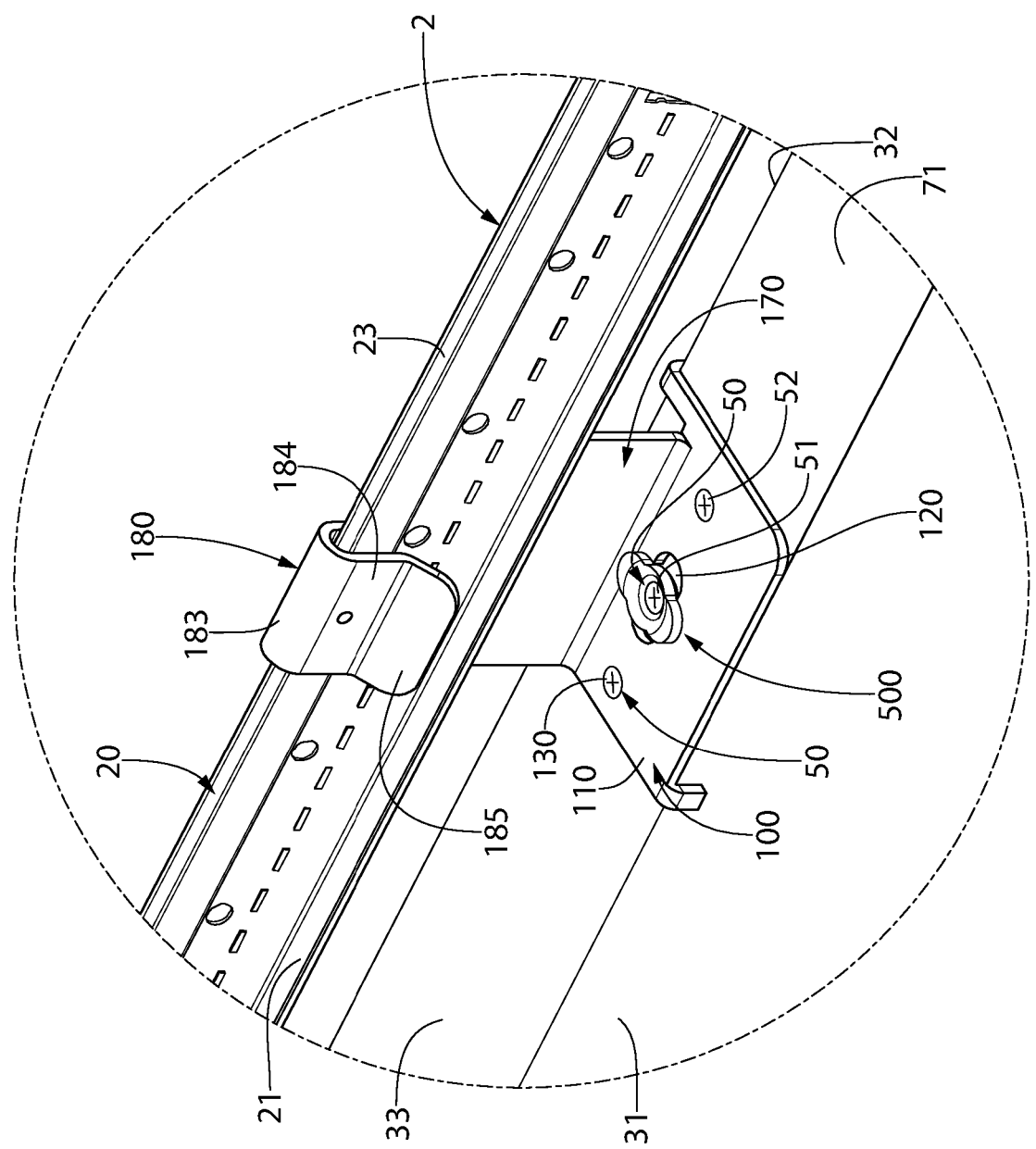
FIG. 37 is a close up of region XLIII of FIG. 36.

The clip portion 183 may extend between the rear arm 182 and the front arm 184, and is curved or angled or shaped to coordinate with the shape of a head portion 23 of a support member 20 (as shown in FIG. 37—discussed in greater detail herein). In one embodiment, the clip portion 183, the rear arm 182, and the front arm 184 are all configured to engage and secure the head portion 23 of a support strut 20. In one embodiment, the clip portion 183, the rear arm 182, and the front arm 184 elastically deflect to engage the head portion 23 by a friction fit.

The mounting flange 110 may comprise a keyhole 120. The keyhole 120 may extend continuously from the top surface 111 to the bottom surface 112 of the mounting flange 110. The keyhole 120 may be inset from the perimeter 113 of the mounting flange 110. The keyhole 120 may be inset from the perimeter 113 of the mounting flange 110 by a positive non-zero distance.

The keyhole 120 may be inset from the first edge 114 of the perimeter 113 by a first inset distance $D_{I1}$ that ranges from about 0.3 inches to about 0.5 inches—including all distances and sub-ranges there-between. In some embodiments, the first inset distance $D_{I1}$ may range from about 0.4 inches to about 0.45 inches—including all distances and sub-ranges there-between.

The keyhole 120 may be inset from the second edge 115 of the perimeter 113 by a second inset distance $D_{I2}$ that ranges from about 0.65 inches to about 0.85 inches—including all distances and sub-ranges there-between. In some embodiments, the second inset distance $D_2$ may range from about 0.7 inches to about 0.8 inches—including all distances and sub-ranges there-between.

The keyhole 120 may be inset from the third edge 116 of the perimeter 113 by a third inset distance $D_{I3}$ that ranges from about 0.75 inches to about 0.9 inches—including all distances and sub-ranges there-between. In some embodiments, the third inset distance $D_3$ may range from about 0.8 inches to about 0.85 inches—including all distances and sub-ranges there-between.

The keyhole 120 may be inset from the fourth edge 117 of the perimeter 113 by a fourth inset distance $D_{I4}$ that ranges from about 1.0 inches to about 1.2 inches—including all distances and sub-ranges there-between. In some embodiments, the fourth inset distance $D_{I4}$ may range from about 1.05 inches to about 1.15 inches—including all distances and sub-ranges there-between.

The keyhole 120 may circumscribed by a keyhole wall 121. The keyhole wall 121 may continuously circumscribe the keyhole 120. The keyhole wall 121 may extend continuously between the top surface 111 and the bottom surface 112 of the mounting flange 110. The keyhole wall 121 may have a height that is substantially equal to the thickness $t_{MF}$ of the mounting flange 110.

A first axis A-A may extend through the keyhole 120. The first axis A-A may extend in a direction that is orthogonal to the bottom surface 112 of the mounting flange 110. The first axis A-A may extend in a direction that is substantially parallel to the keyhole wall 121. In a non-limiting embodiment, the first axis A-A may be centered on the keyhole 120. In other embodiments, the first axis A-A may not be centered on the keyhole 120 so long as it passes through the keyhole 120.

In some embodiments, the keyhole 120 may be discorectangle in shape. In other embodiments, the keyhole 120 may comprise a central opening portion 123 and at least one slot opening portion 124. In some embodiments, the keyhole 120 may comprise a first slot opening portion 124a. In some embodiments, the keyhole 120 may comprise a first slot opening portion 124a and a second slot opening portion 124b. The first slot opening portion 124a and the second slot opening portion 124b may be opposite each other about the central opening portion 123.

The first axis A-A may pass through the central opening portion 123. The central opening portion 123 of the keyhole 120 may have a first diameter $D_{K1}$. The at least one slot opening portion 124 may have a second diameter $D_{K2}$. The first diameter $D_{K1}$ and the second diameter $D_{K2}$ may not be equal. In some embodiments, the first diameter $D_{K1}$ is greater than the second diameter $D_{K2}$. In a non-limiting alternative embodiment, the first diameter $D_{K1}$ and the second diameter $D_{K2}$ may be equal.

The first slot opening portion 124a may have an opening that is equal to the size of the second diameter $D_{K2}$. The second slot opening portion 124b may have an opening that is equal to the size of a third diameter. The third diameter may be substantially equal to the second diameter $D_{K2}$. In other embodiments, the third diameter and the second diameter $D_{K2}$ may not be equal.

The first diameter $D_{K1}$ may range from about 0.4 inches to about 0.65 inches—including all diameters and sub-ranges there-between. In some embodiments, the first diameter $D_{K1}$ may range from about 0.48 inches to about 0.60 inches—including all diameters and sub-ranges there-between.

The second diameter $D_{K2}$ may range from about 0.325 inches to about 0.475 inches—including all diameters and sub-ranges there-between. In some embodiments, the second diameter $D_{K2}$ may range from about 0.375 inches to about 0.425 inches—including all diameters and sub-ranges there-between.

A ratio of the first diameter $D_{K1}$ to the second diameter $D_{K2}$ may range from about 1.1:1 to about 1.5:1—including all ratios and sub-ranges there-between. In some embodiments, the ratio of the first diameter $D_{K1}$ to the second diameter $D_{K2}$ may range from about 1.2:1 to about 1.4:1—including all ratios and sub-ranges there-between. In some embodiments, the ratio of the first diameter $D_{K1}$ to the second diameter $D_{K2}$ may be about 1.31:1.

The at least one slot opening portion 124 may be horizontally offset from the first axis A-A. In some embodiments, the at least one slot opening portion 124 may be horizontally offset from the first axis A-A by a distance that is substantially equal to the first diameter $D_{K1}$. In some embodiments, the first slot opening portion 124a may be horizontally offset from the first axis A-A by a distance that is substantially equal to the first diameter $D_{K1}$. In some embodiments, the second slot opening portion 124b may be horizontally offset from the first axis A-A by a distance that is substantially equal to the first diameter $D_{K1}$.

The mounting flange 110 may comprise at least one mounting hole 130. The at least one mounting hole 130 may extend continuously from the top surface 111 to the bottom surface of the mounting flange 110. The mounting hole 130 may be circumscribed by a mounting hole wall 131. The mounting hole wall 131 may continuously circumscribe the mounting hole 130. The mounting hole wall 131 may extend continuously between the top surface 111 and the bottom surface 112 of the mounting flange 110. The mounting hole wall 131 may have a height that is substantially equal to the thickness $t_{MF}$ of the mounting flange 110.

The mounting hole 130 may form an opening that has a diameter $D_M$ ranging from about 0.15 inch to about 0.35 inch—including all diameters and sub-ranges there-between. In some embodiments, the diameter $D_M$ of the mounting hole 130 may range from about 0.22 inches.

The at least one mounting hole 130 may be inset from the perimeter 113 of the mounting flange 110 by a non-zero positive distance. The at least one mounting hole 130 may be inset from the keyhole 120 by a non-zero positive distance.

The at least one mounting hole 130 may comprise a first mounting hole 130a. In some embodiments, the at least one mounting hole 130 may comprise a first mounting hole 130a and a second mounting hole 130b. The first mounting hole 130a and the second mounting hole 130b may be arranged on opposite sides of the keyhole 120.

The first mounting hole 130a may be inset from the first edge 114 of the perimeter 113 by a fifth inset distance $D_{I5}$ that ranges from about 0.43 inches to about 0.55 inches—including all distances and sub-ranges there-between. In some embodiments, the fifth inset distance $D_{I5}$ may be about 0.48 inches.

The first mounting hole 130a may be inset from the second edge 115 of the perimeter 113 by a sixth inset distance $D_{I6}$ that ranges from about 0.85 inches to about 1.05 inches—including all distances and sub-ranges there-between. In some embodiments, the sixth inset distance $D_{I6}$ may be about 0.91 inches.

The first mounting hole 130a may be inset from the third edge 116 of the perimeter 113 by a seventh inset distance $D_{I7}$ that ranges from about 0.35 inches to about 0.45 inches—including all distances and sub-ranges there-between. In some embodiments, the sixth inset distance $D_{I6}$ may be about 0.39 inches—including all distances and sub-ranges there-between.

The first mounting hole 130a may be inset from the keyhole 120 by an eighth inset distance $D_{I8}$ that ranges from about 0.55 inches to about 0.66 inches—including all distances and sub-ranges there-between. In some embodiments, the eighth inset distance $D_{I8}$ may about 0.61 inches.

In some embodiments, the at least one mounting hole 130 may comprise a second mounting hole 130b. The second mounting hole 130b may be inset from the first edge 114 of the perimeter 113 by a ninth inset distance $D_{I9}$. In some embodiments, the ninth inset distance $D_{I9}$ may be substantially equal to the fifth inset distance DIS. The second mounting hole 130b may be inset from the second edge 115 of the perimeter 113 by a tenth inset distance $D_{I10}$. In some embodiments, the tenth inset distance $D_{I10}$ may be substantially equal to the sixth inset distance $D_{I6}$.

The second mounting hole 130b may be inset from the fourth edge 117 of the perimeter 113 by a eleventh inset distance $D_{I11}$ that ranges from about 0.15 inches to about 0.25 inches—including all distances and sub-ranges there-between. In some embodiments, the eleventh inset distance $D_{I11}$ may be about 0.2 inches.

The second mounting hole 130b may be inset from the keyhole 120 by an twelfth inset distance $D_{I12}$ that ranges from about 0.35 inches to about 0.45 inches—including all distances and sub-ranges there-between. In some embodiments, the eighth inset distance $D_{I12}$ may about 0.41 inches.

A ratio of the first diameter $D_{K1}$ of the central opening portion 123 to the diameter $D_M$ of the at least one mounting hole 130 may range from about 1.5:1 to about 3.5:1—including all ratios and sub-ranges there-between. In some embodiments, the ratio of the first diameter $D_{K1}$ of the central opening portion 123 to the diameter $D_M$ of the at least one mounting hole 130 may be about 2.4:1.

A ratio of the second diameter $D_{K2}$ of the slot opening portion 124 to the diameter $D_M$ of the at least one mounting hole 130 may range from about 1.3:1 to about 2.2:1—including all ratios and sub-ranges there-between. In some embodiments, the ratio of the second diameter $D_{K2}$ of the slot opening portion 124 to the diameter $D_M$ of the at least one mounting hole 130 may be about 1.85:1.

The mounting clip 100 may comprise at least one alignment tab 140. The at least one alignment tab 140 may extend downward from the mounting flange 110. In some embodiments, the alignment tab 140 may extend both horizontally outward and vertically downward from the mounting flange 110.

The alignment tab 140 may comprise a proximal end 141 and a distal end 142. The proximal end 141 of the alignment tab 140 may located adjacent to the mounting flange 110. In some embodiments, the proximal end 141 of the alignment tab 140 may located adjacent to the perimeter 113 of the mounting flange 110. The alignment tab 140 may terminate at the distal end 142.

The alignment tab 140 may comprise a vertical portion 144. The alignment tab 140 may comprise a horizontal portion 143. In some embodiments, the alignment tab 140 may comprise a horizontal portion 143 and a vertical portion 144. In some embodiments, the alignment tab 140 may comprise only the vertical portion 144.

The alignment tab 140 may extend downward from the mounting flange 110 to the distal end 142 to a first tab distance $D_{T1}$ as measured from the bottom surface 112 of the mounting flange 110 to the distal end 142 of the alignment tab 140 along the Z-axis. The first tab distance $D_{T1}$ is a positive, non-zero value. The first tab distance $D_{T1}$ may range from about 0.2 inches to about 0.5 inches—including all distances and sub-ranges there-between. In some embodiments, the first tab distance $D_{T1}$ may range from about 0.3 inches to about 0.4 inches—including all distances and sub-ranges there-between. The height of the vertical portion 144 of the alignment tab 140 may be substantially equal to the first tab distance $D_{T1}$.

For embodiments where the alignment tab 140 comprises a horizontal portion 143, the alignment tab 140 may extend outward a second tab distance $D_{T2}$ from the mounting flange 110 to the vertical portion 144, the second tab distance $D_{T2}$ being measured from the perimeter 113 of the mounting flange 110 to the vertical portion 144 of the alignment tab 140 along the X-axis. The second tab distance $D_{T2}$ is a positive, non-zero value. The second tab distance $D_{T2}$ may range from about 0.35 inches to about 0.65 inches—including all distances and sub-ranges there-between. In some embodiments, the second tab distance $D_{T2}$ may range from about 0.45 inches to about 0.55 inches—including all distances and sub-ranges there-between. The length of the horizontal portion 143 of the alignment tab 140 may be substantially equal to the second tab distance $D_{T2}$.

In some embodiments, the alignment tab 140 may comprise an outer edge 145 opposite an inner edge 146. The outer edge 145 of the alignment tab 140 may face away from the keyhole 120 when viewed along the Y-axis. The inner edge 146 of the alignment tab 140 may face away from the keyhole 120 when viewed along the Y-axis. In some embodiments, the outer edge 145 of the alignment tab 140 may be substantially coplanar with the fourth edge 117 of the perimeter 113. In some embodiments, the outer edge 145 of the alignment tab 140 may be substantially coplanar with the third edge 116 of the perimeter 113.

In some embodiments, the outer edge 145 of the alignment tab 140 may be substantially coplanar with the side surface 175 of the positioning member 170. In some embodiments, the outer edge 145 of the alignment tab 140 may be horizontally offset from the side surface 175 of the positioning member 170 by a third tab distance $D_{T3}$ as measured along the Y-axis. The third tab distance $D_{T3}$ is a positive, non-zero value. The third tab distance $D_{T3}$ may range from about 0.15 inches to about 0.3 inches—including all distances and sub-ranges there-between. In some embodiments, the third tab distance $D_{T3}$ may range from about 0.2 inches to about 0.25 inches—including all distances and sub-ranges there-between. The third tab distance $D_{T3}$ may be substantially equal to the width of the alignment tab 140.

The horizontal portion 143 of the alignment tab 140 may comprise an inner wall 143a opposite an outer wall 143b. The vertical portion 144 of the alignment tab 140 may comprise an inner wall 144a opposite an outer wall 144b. The inner wall 144a of the vertical portion 144 may be substantially orthogonal to the inner wall 143a of the horizontal portion 143 of the alignment tab 140.

The inner wall 144a of the vertical portion 144 of the alignment tab 140 may face toward the keyhole 120 as viewed along the X-axis. The outer wall 144b of the vertical portion 144 of the alignment tab 140 may face away from the keyhole 120 as viewed along the X-axis.

The inner wall 143a of the horizontal portion 143 of the alignment tab 140 may face the same direction as the bottom surface 112 of the mounting flange 110 as viewed along the Y-axis. The outer wall 143b of the horizontal portion 143 of the alignment tab 140 may the same direction as the top surface 111 of the mounting flange 110 as viewed along the Y-axis.

Figure 6:
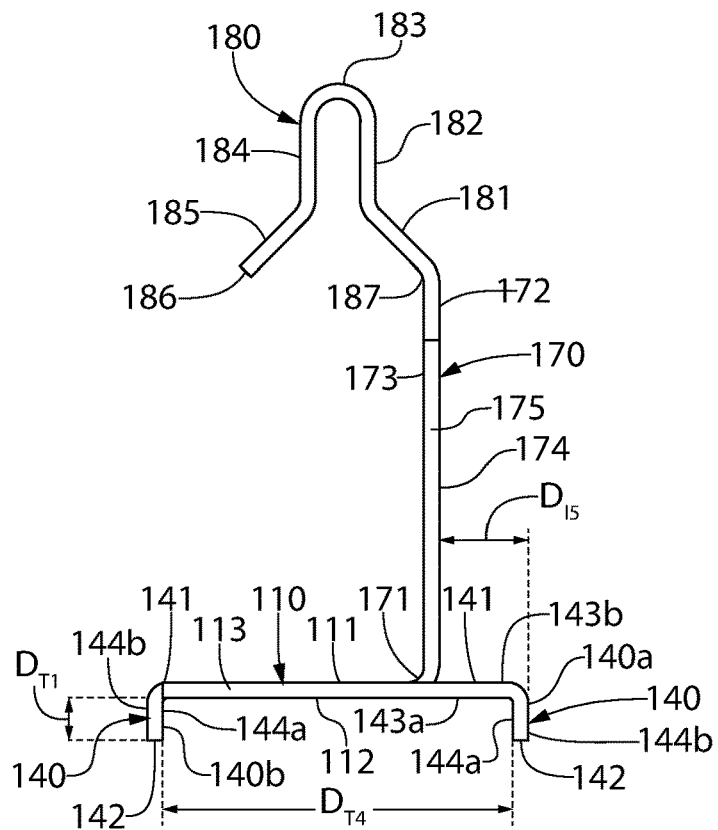
FIG. 6 is a side elevation view of the mounting clip of FIG. 1.
Figure 7:
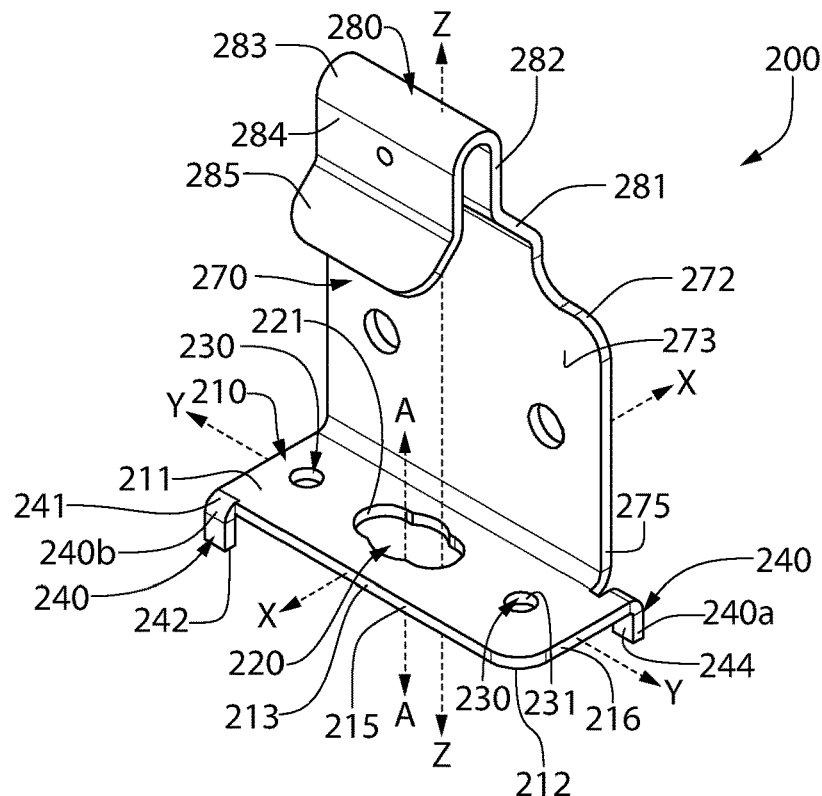
FIG. 7 is a front perspective view of a mounting clip according to another embodiment for use in a ceiling system according to the present disclosure.
Figure 8:
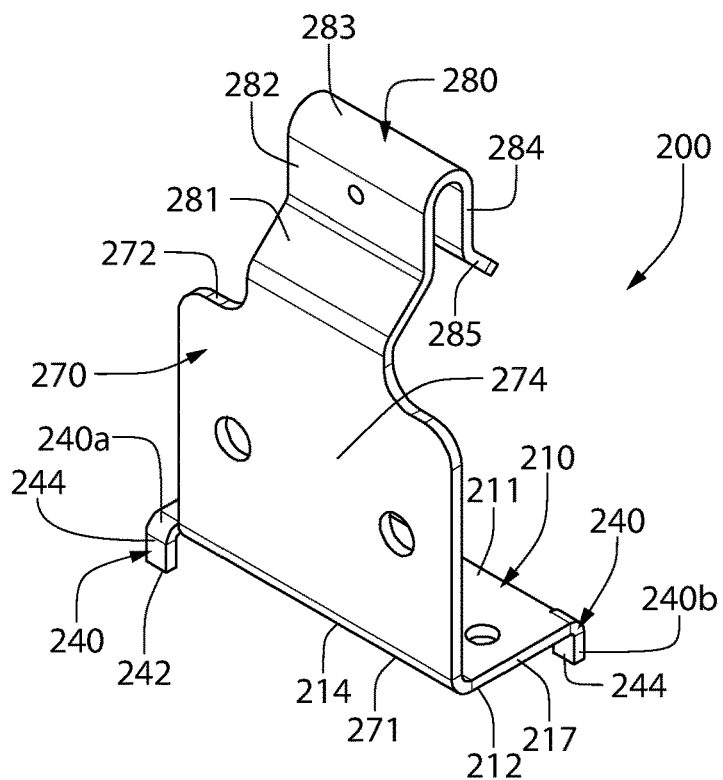
FIG. 8 is a rear perspective view of the mounting clip of FIG. 7.
Figure 9:
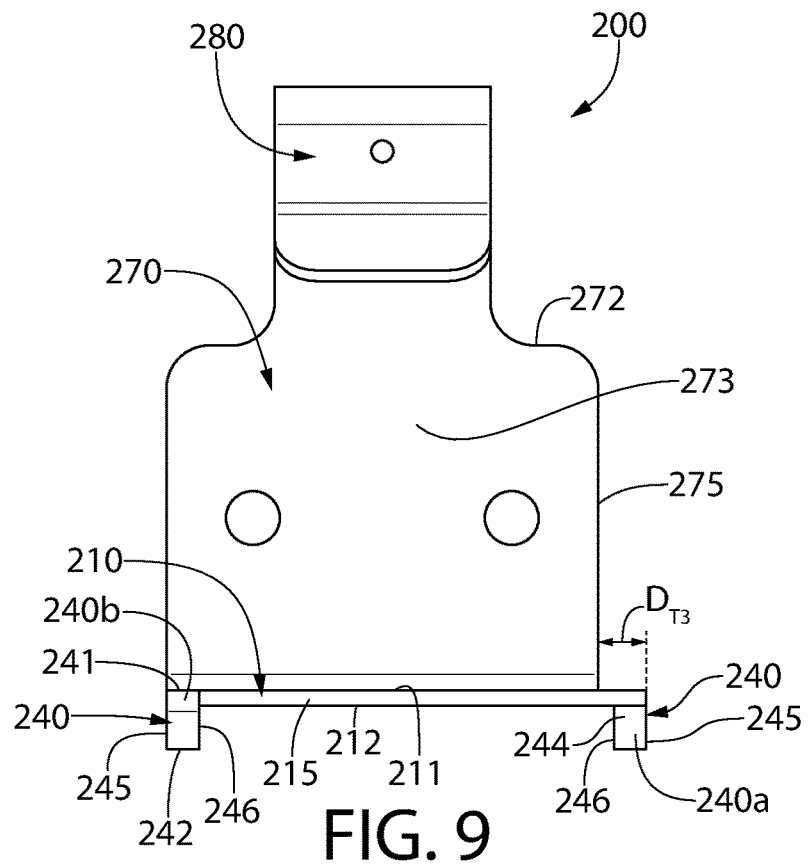
FIG. 9 is a front elevation view of the mounting clip of FIG. 7.
Figure 10:
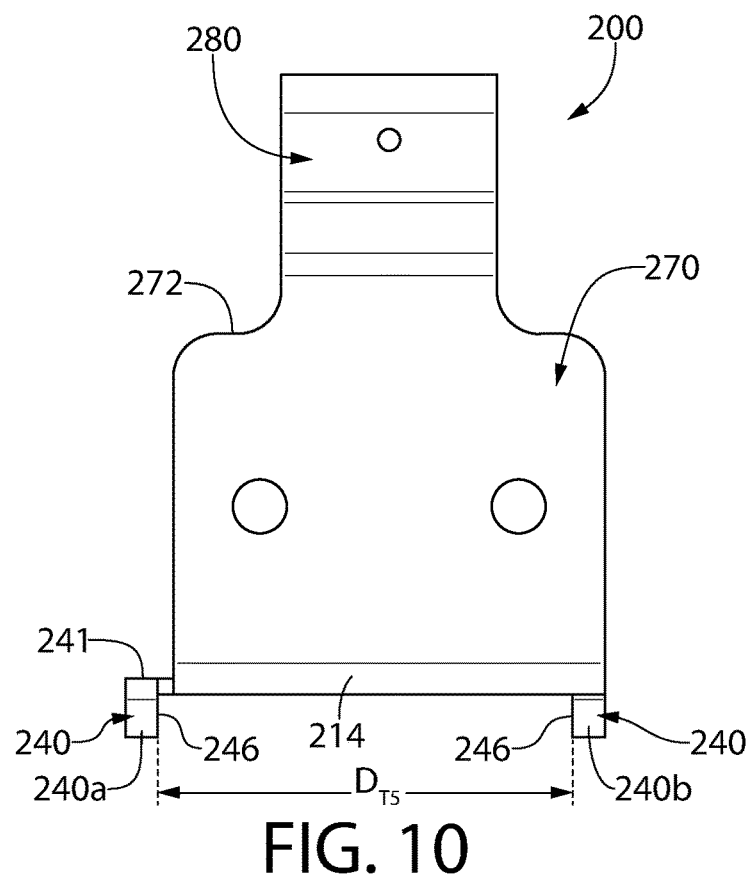
FIG. 10 is a rear elevation view of the mounting clip of FIG. 7.
Figure 11:
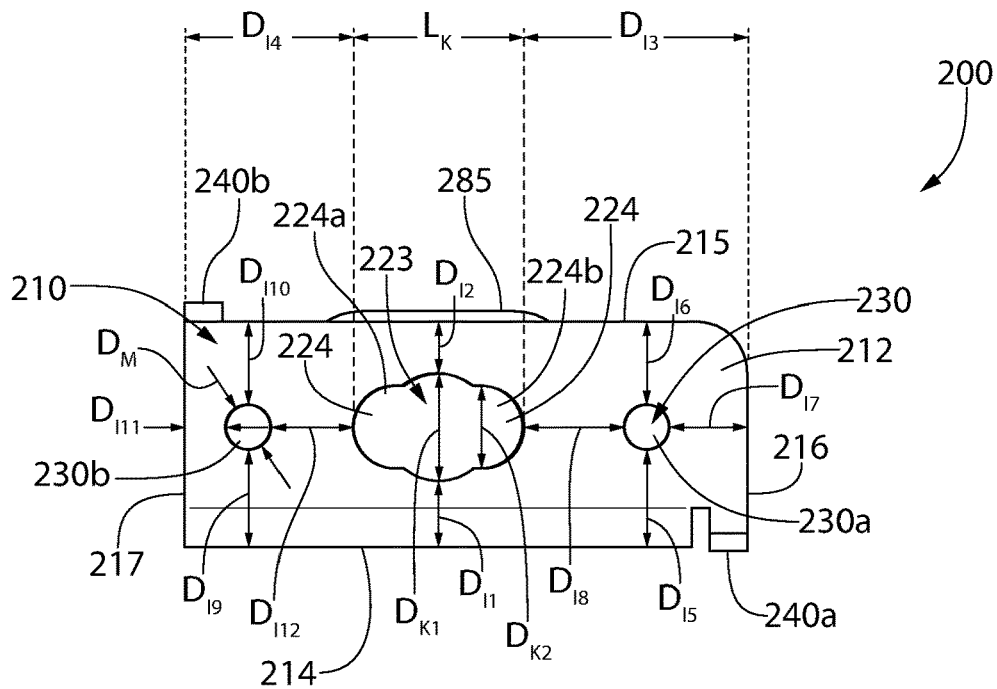
FIG. 11 is a bottom view of the mounting clip of FIG. 7.
Figure 12:
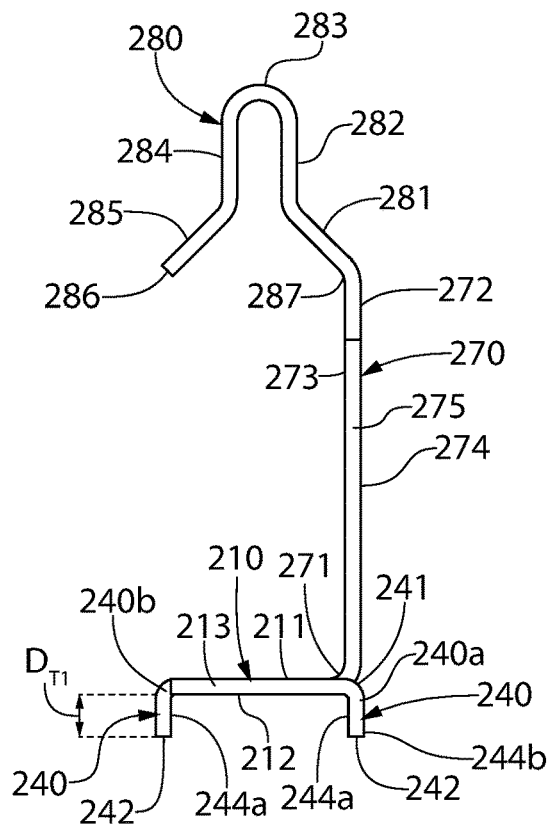
FIG. 12 is a side elevation view of the mounting clip of FIG. 7.
Figure 13:
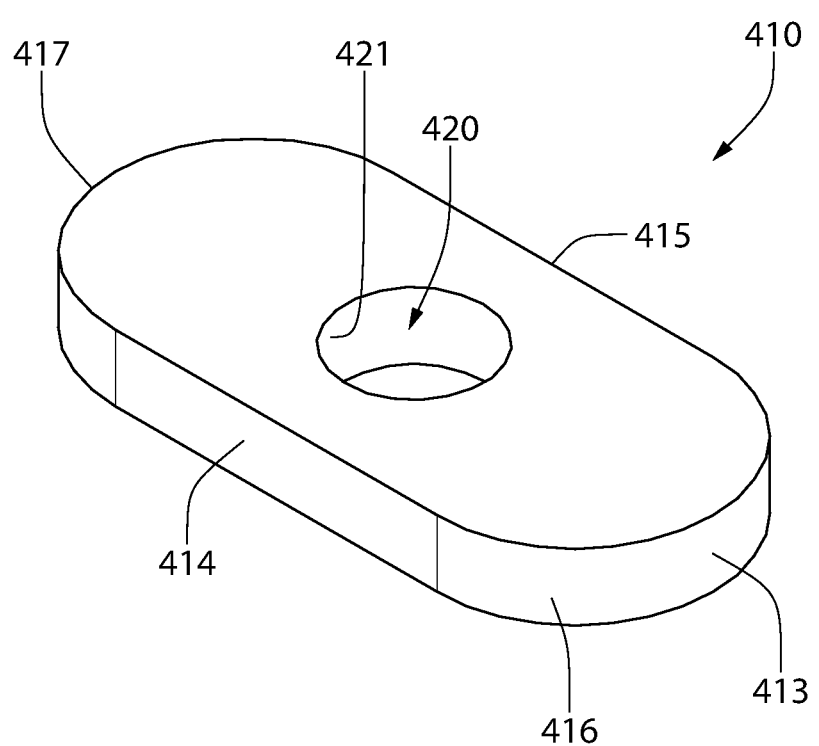
FIG. 13 is a perspective view of a mounting tab of a mounting key of one embodiment.
Figure 14:
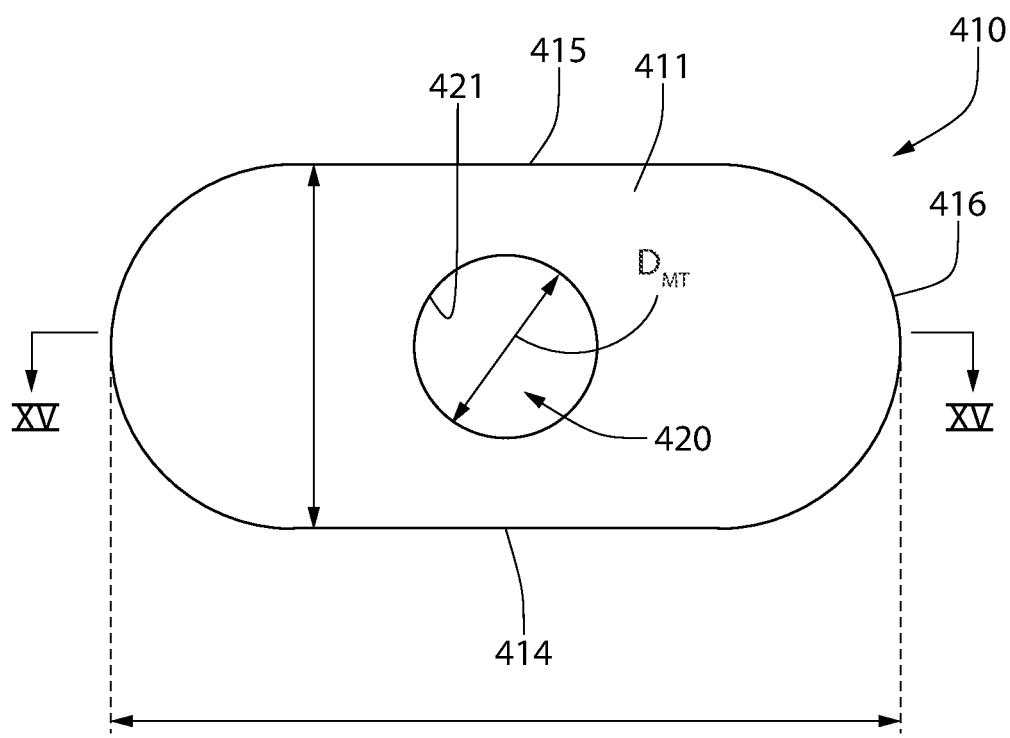
FIG. 14 is a top view of the mounting tab of FIG. 13.
Figure 15:
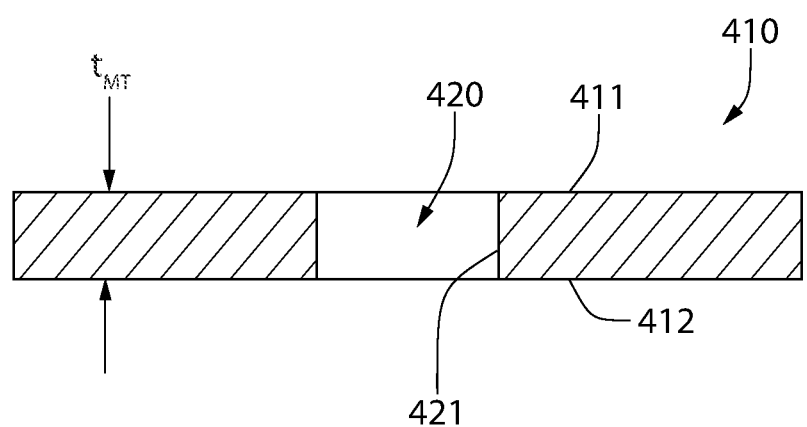
FIG. 15 is a cross-sectional view of the mounting tab of FIG. 20 along line XVI-XVI.
Figure 16:
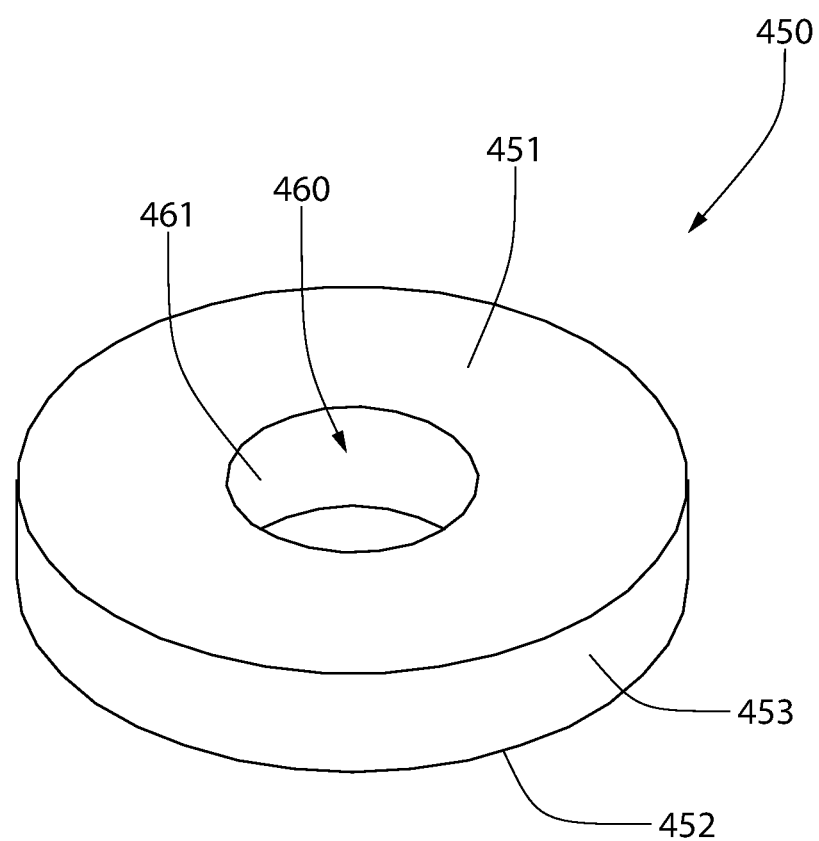
FIG. 16 is a perspective view of a mounting spacer of the mounting key of one embodiment.
Figure 17:
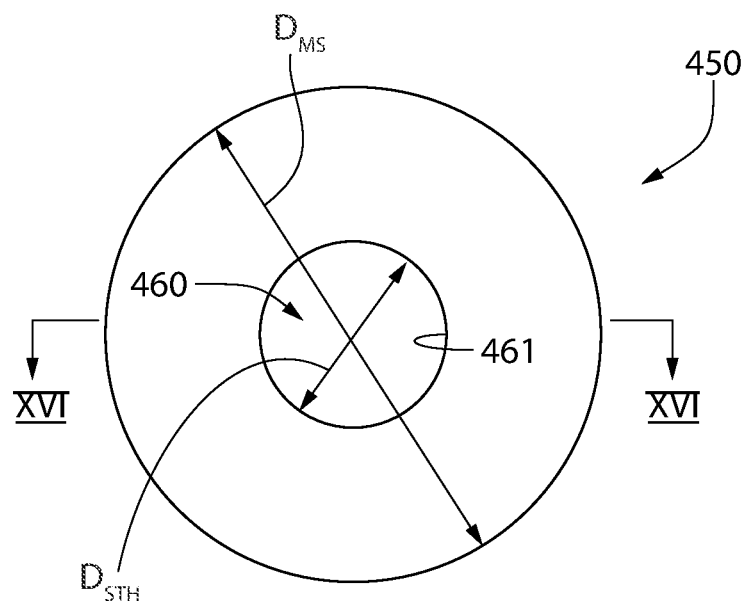
FIG. 17 is a top view of the mounting spacer of FIG. 16.
Figure 18:
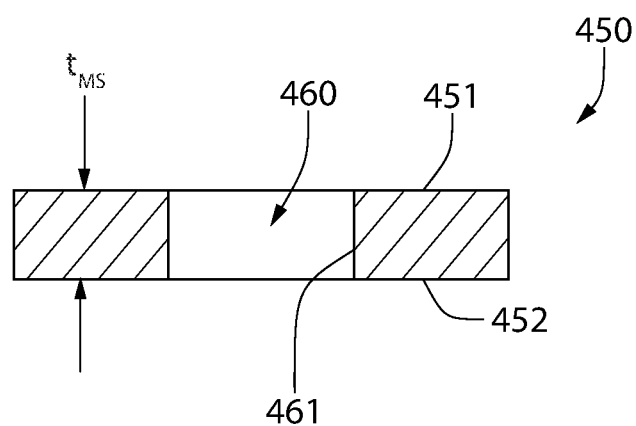
FIG. 18 is a cross-sectional view of the mounting tab of FIG. 17 along line XVI-XVI.
Figure 19:
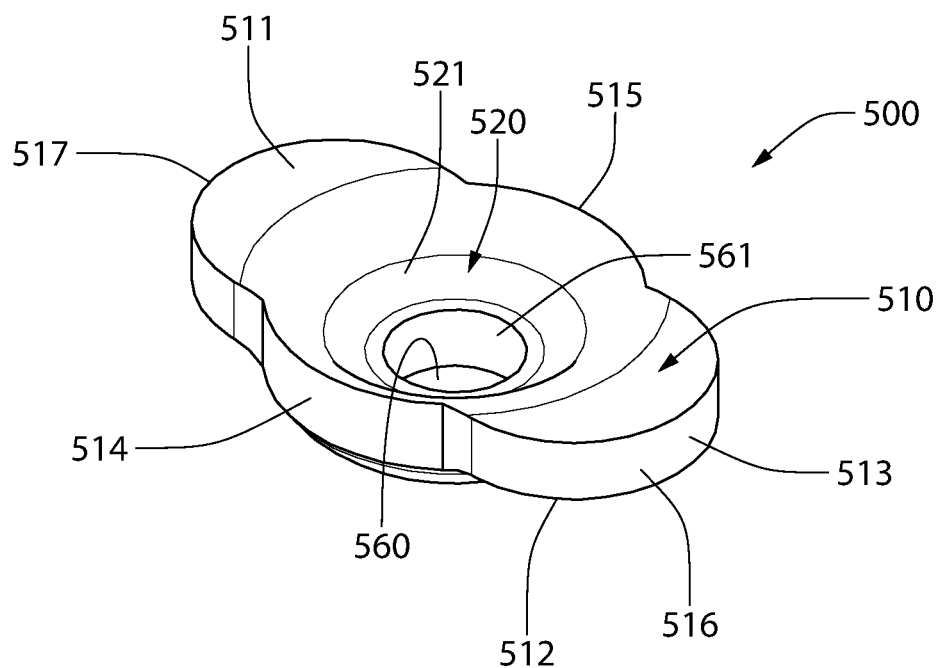
FIG. 19 is a top perspective view of a mounting key according to another embodiment.
Figure 20:
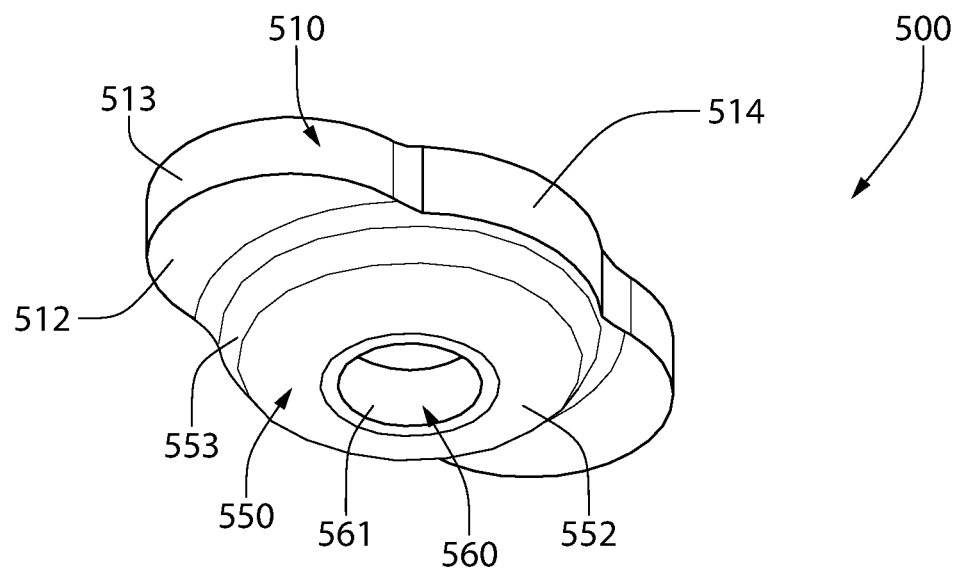
FIG. 20 is a bottom perspective view of the mounting key of FIG. 19.
Figure 21:
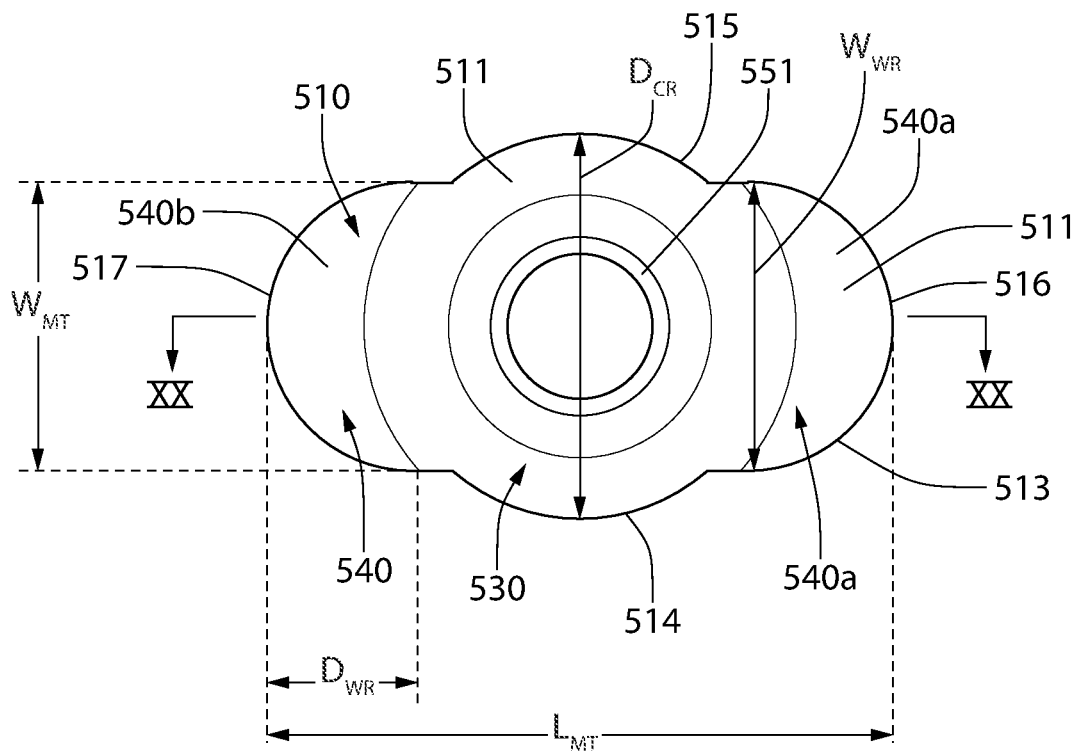
FIG. 21 is a top view of the mounting key of FIG. 19.
Figure 22:
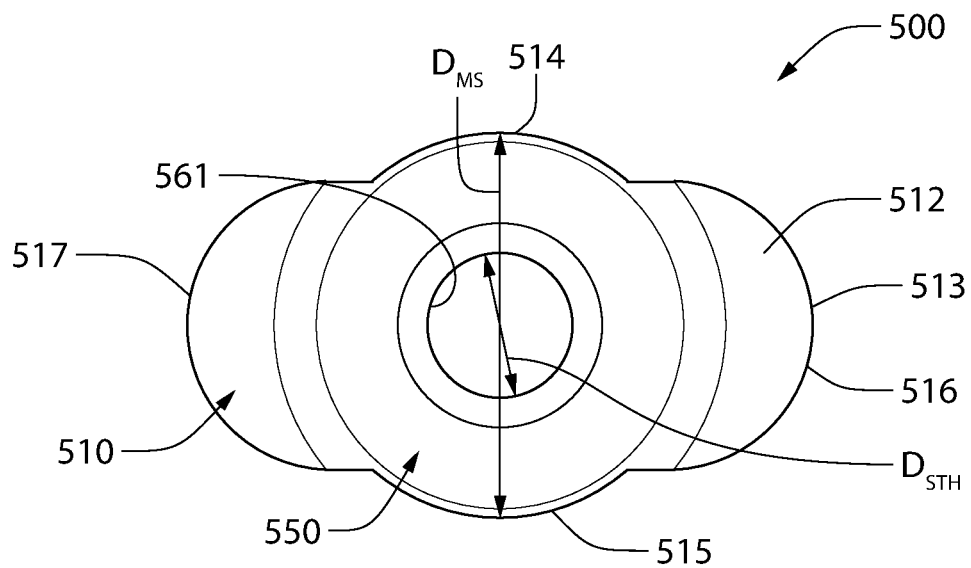
FIG. 22 is a bottom view of the mounting key of FIG. 19.
Figure 23:
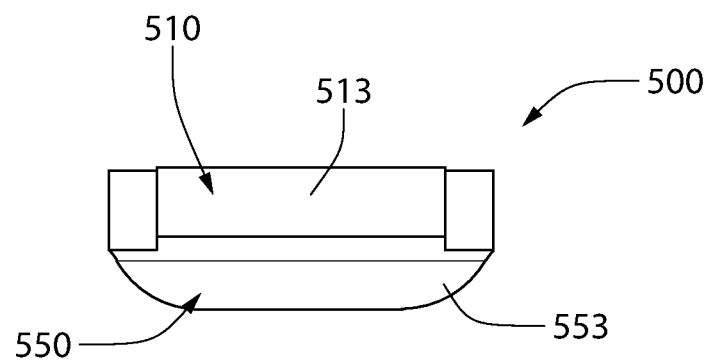
FIG. 23 is a side view of the mounting key of FIG. 19.
Figure 24:
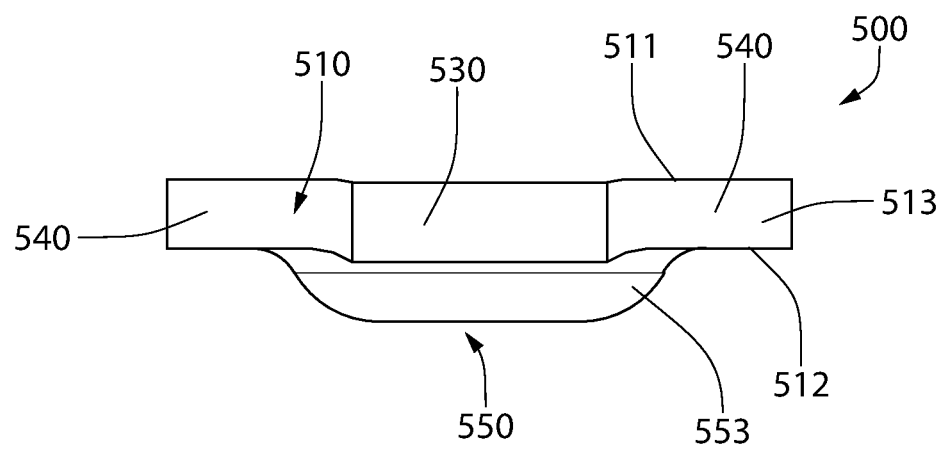
FIG. 24 is a front view of the mounting key of FIG. 19.
Figure 25:
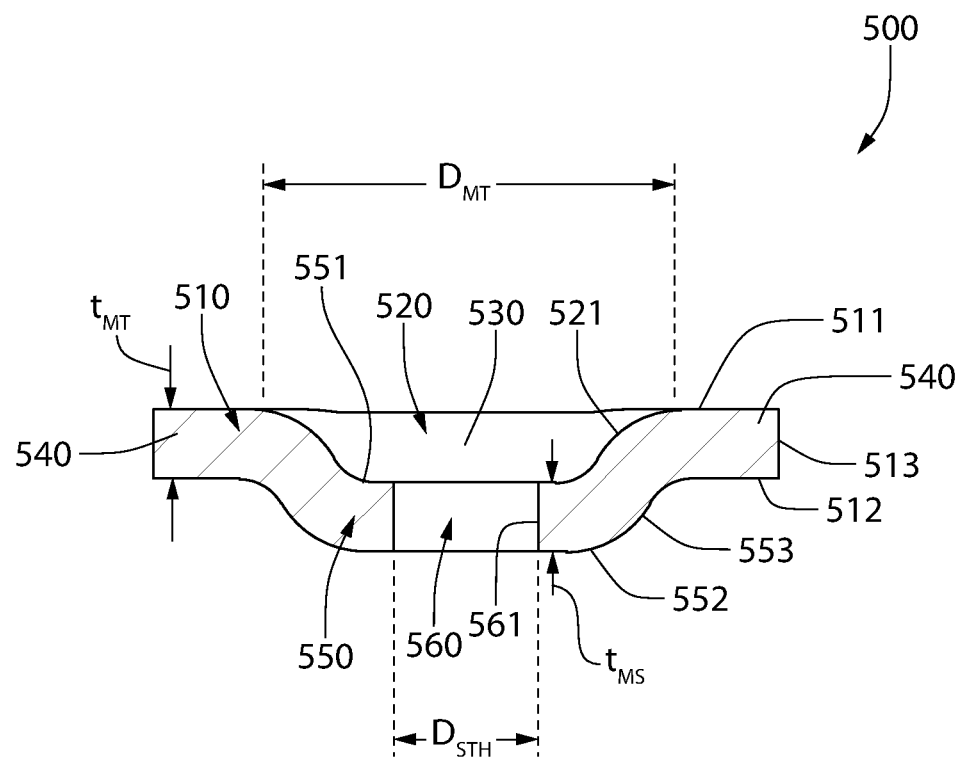
FIG. 25 is a cross-sectional view of the mounting key of FIG. 21 along line XX-XX.
Figure 26:
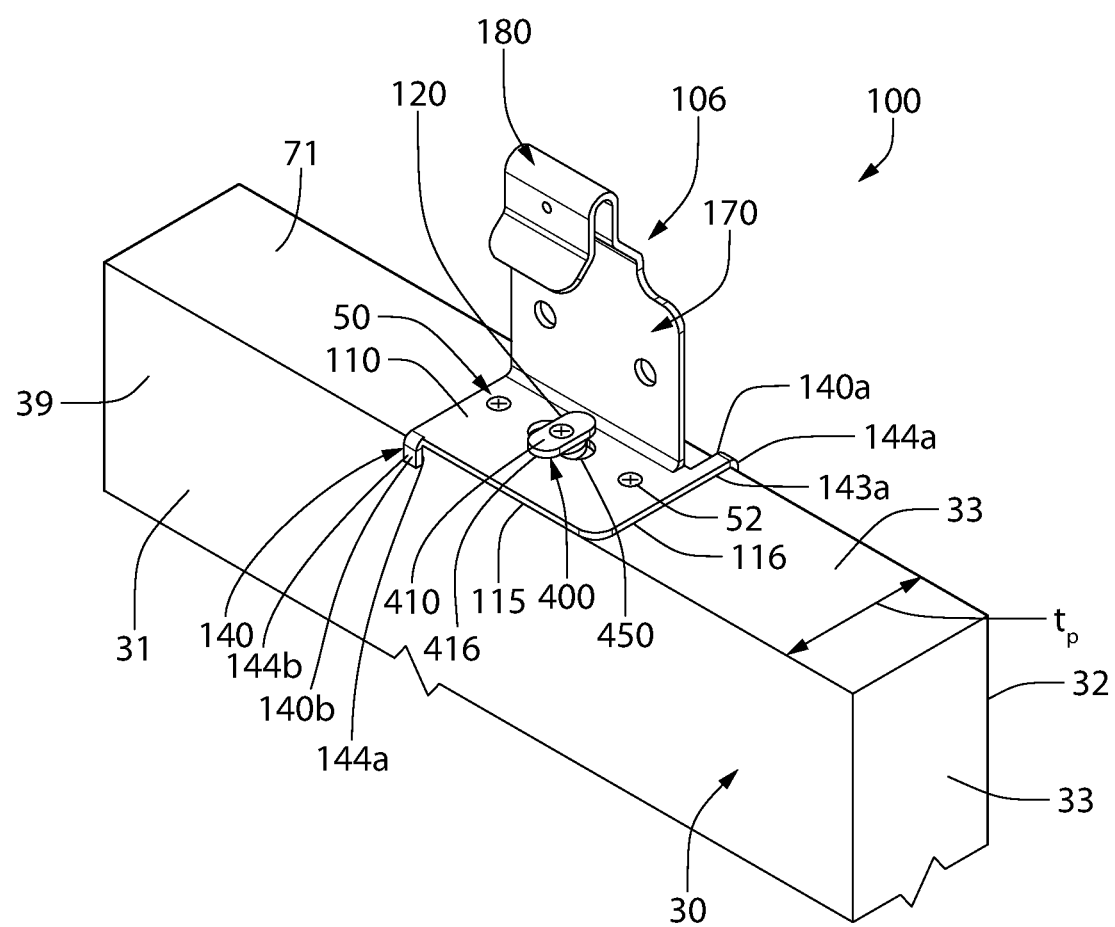
FIG. 26 is a perspective view of a panel assembly comprising the mounting clip attached to a panel by the mounting key.
Figure 27:
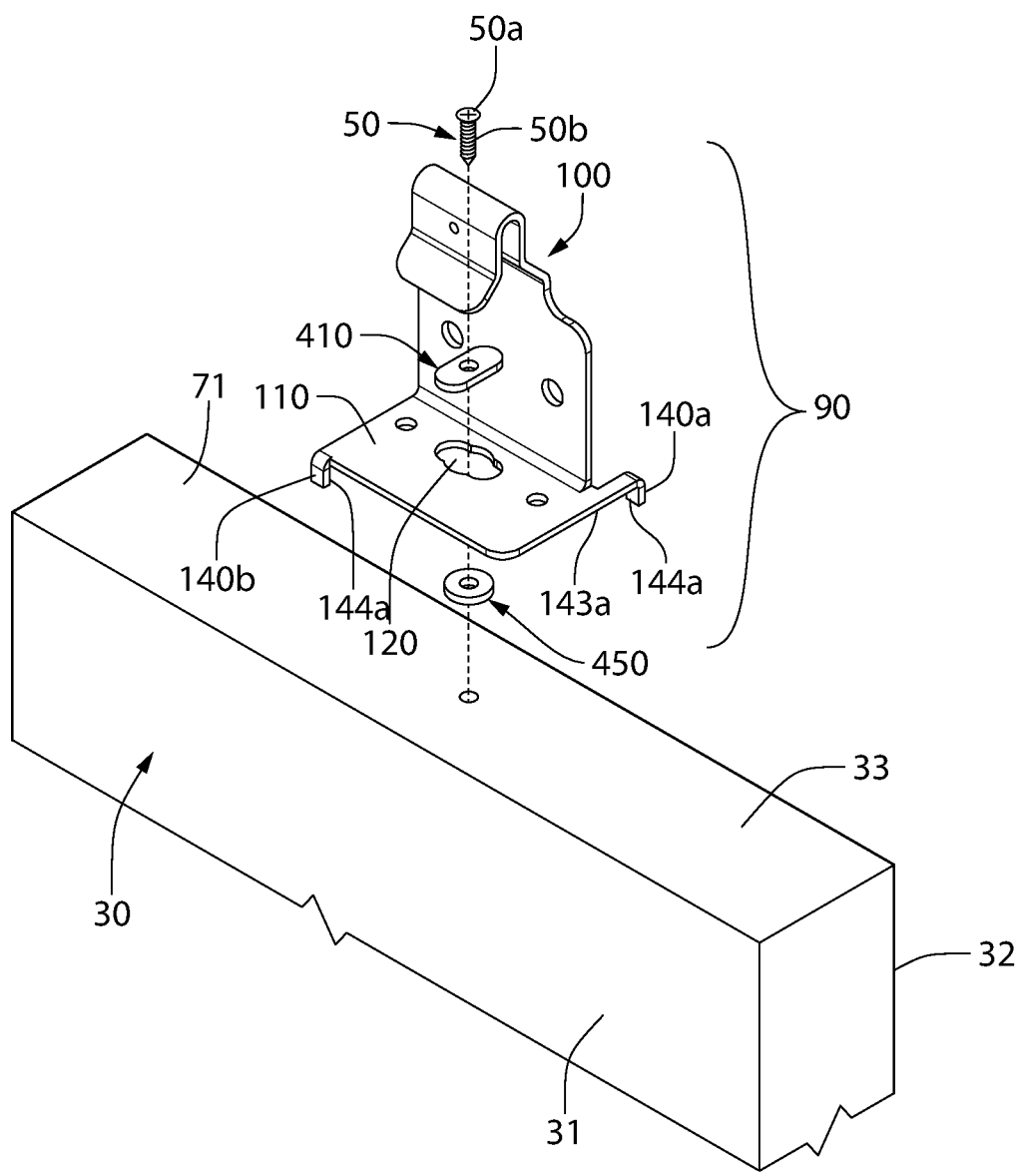
FIG. 27 is an exploded perspective view of the panel assembly of FIG. 26.
Figure 28:
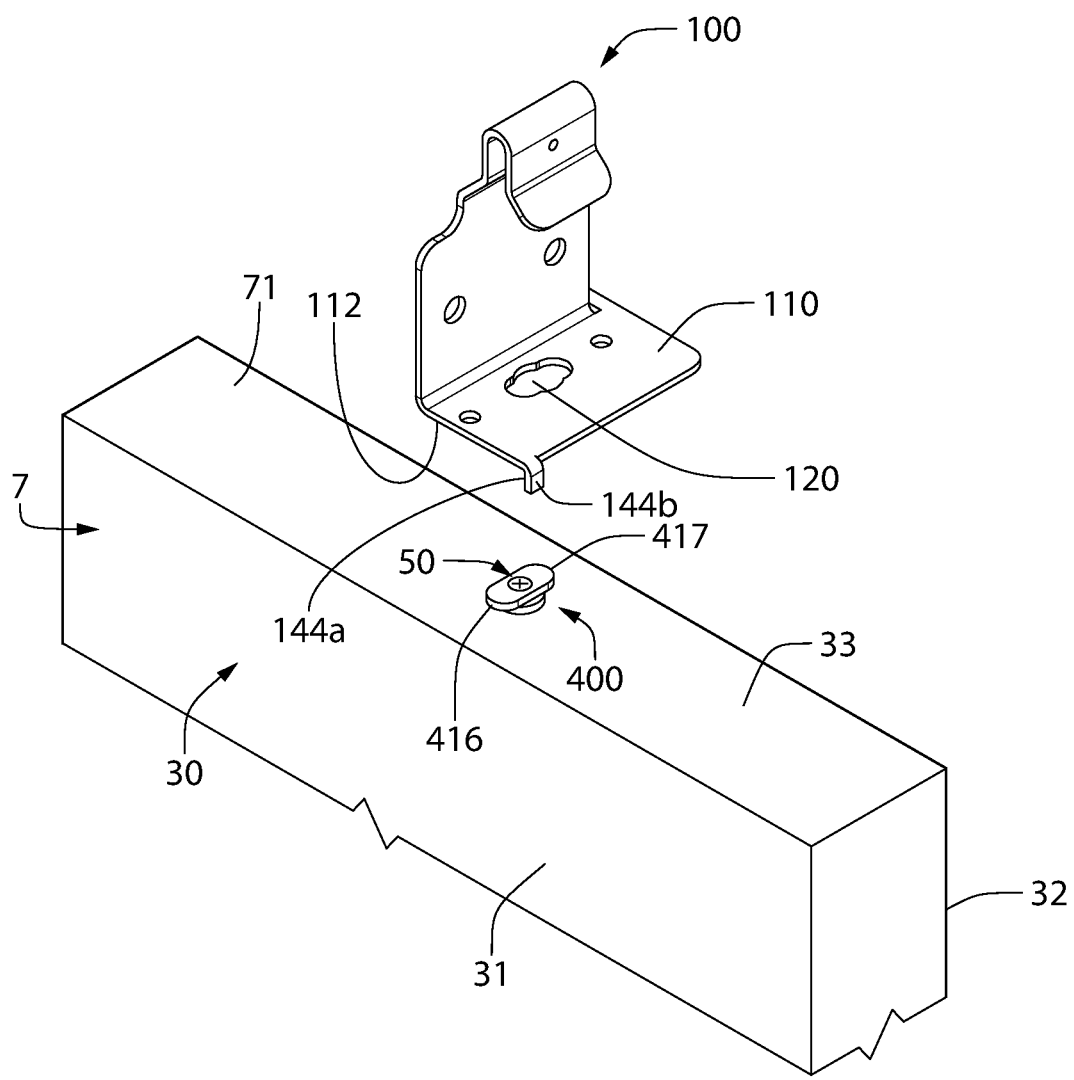
FIGS. 28-35 are perspective views of the mounting clip being attached to the panel to form the panel assembly of FIG. 26.

For embodiments where the alignment tab 140 comprises the horizontal portion 143, the alignment tab 140 may be such that the horizontal portion 143 is substantially coplanar with the bottom surface 112 of the mounting flange 110 (as shown in FIG. 6). In particular, the inner surface 143a of the horizontal portion 143 of the alignment tab 140 may be substantially coplanar with the bottom surface 112 of the mounting flange 110. In other embodiments, the inner surface 143a of the horizontal portion 143 of the alignment tab 140 may be positioned above the bottom surface 112 of the mounting flange 110 (not shown).

In some embodiments, the at least one alignment tab 140 may comprise a first alignment tab 140a. In some embodiments, the at least one alignment tab 140 may comprise the first alignment tab 140a and a second alignment tab 140b.

The first alignment tab 140a and the second alignment tab 140 may be oriented about the first axis A-A such that the first alignment tab 140 and the second alignment tab 140 are offset by 180 degrees as measured about the first axis A-A. Having a 180 degree orientation about the first axis A-A refers to the first alignment tab 140a and the second alignment tab 140b being in the same position relative to the A-A axis except rotated 180 degrees about the first axis A-A. In a non-limiting example, the inner surface 143a of the first alignment tab 140a may at least partially overlap with the inner surface 143a of the second alignment tab 140b if the either one of the first alignment tab 140a or second alignment tab 140b were to be rotated 180 degrees about the first axis A-A. Partial overlap may occur if the first alignment tab 140a and/or second alignment tab 140 has differing values for the first tab distance $D_{T1}$.

The inner wall 144a of the vertical portion 144 of the first alignment tab 140a and the inner wall 144a of the vertical portion 144 of the second alignment tab 140b may be substantially parallel. The outer wall 144b of the vertical portion 144 of the first alignment tab 140a and the outer wall 144b of the vertical portion 144 of the second alignment tab 140b may be substantially parallel.

The inner wall 143a of the horizontal portion 143 of the first alignment tab 140a and the inner wall 143a of the horizontal portion 143 of the second alignment tab 140b may be substantially parallel. The outer wall 143b of the horizontal portion 143 of the first alignment tab 140a and the outer wall 143b of the horizontal portion 143 of the second alignment tab 140b may be substantially parallel.

The first alignment tab 140a may be located adjacent to the first edge 114 of the perimeter 113 of the mounting flange 110. The first alignment tab 140a may be located adjacent to the third edge 116 of the perimeter 113 of the mounting flange 110. The first alignment tab 140a may be located adjacent to both of the first edge 114 and the third edge 116 of the perimeter 113 of the mounting flange 110.

The second alignment tab 140b may be located adjacent to the second edge 115 of the perimeter 113 of the mounting flange 110. The second alignment tab 140b may be located adjacent to the fourth edge 117 of the perimeter 113 of the mounting flange 110. The second alignment tab 140b may be located adjacent to both of the second edge 115 and the fourth edge 117 of the perimeter 113 of the mounting flange 110.

The inner wall 144a of the vertical portion 144 of the first alignment tab 140a and the inner wall 144a of the vertical portion 144 of the second alignment tab 140b may be horizontally offset by a fourth tab distance $D_{T4}$ as measured along the X-axis (also referred to as a "first tab offset distance"). The fourth tab distance $D_{T4}$ may be a non-zero positive value. The fourth tab distance $D_{T4}$ may be a non-zero positive value.

The fourth tab distance $D_{T4}$ may range from about 0.7 inches to about 2.2 inches—including all distances and sub-ranged there-between. The fourth tab distance $D_{T4}$ for the mounting clip 100 may range from about 1.8 inches to about 2.2 inches—including all distances and sub-ranged there-between. In some embodiments, the fourth tab distance $D_{T4}$ for the mounting clip 100 may range from about 1.9 inches to about 2.1 inches—including all distances and sub-ranged there-between.

The inner surface 146 of the first alignment tab 140a and the inner surface 146 of the second alignment tab 140b may be horizontally offset by a fifth tab distance $D_{T5}$ as measured along the Y-axis (also referred to as a "second tab offset distance"). The fifth tab distance $D_{T5}$ may be a non-zero positive value. The fifth tab distance $D_{T5}$ may range from about 2.2 inches to about 2.6 inches—including all distances and sub-ranged there-between.

A ratio of the fourth tab distance $D_{T4}$ to the fifth tab distance $D_{T5}$ may range from about 0.35:1 to about 0.95:1—including all ratios and sub-ranges there-between. In some embodiments, the ratio of the fourth tab distance $D_{T4}$ to the fifth tab distance $D_{T5}$ may range from about 0.75:1 to about 0.95:1 for the mounting clip 100—including all ratios and sub-ranges there-between. In some embodiments, the ratio of the fourth tab distance $D_{T4}$ to the fifth tab distance $D_{T5}$ may range from about 0.8:1 to about 0.95:1 for the mounting clip 100—including all ratios and sub-ranges there-between.

Referring now to FIGS. 7-12, mounting clip 200 is illustrated in accordance with another embodiment of the present invention. The mounting clip 200 is similar to the mounting clip 100 except as described herein below. The description of the mounting clip 100 above generally applies to the mounting clip 200 described below except with regard to the differences specifically noted below. A similar numbering scheme will be used for the mounting clip 200 as with the mounting clip 100 except that the 200-series of numbers will be used.

The keyhole 220 of the mounting flange 210 may be inset from the first edge 214 of the perimeter 213 by a first inset distance $D_{I1}$ that ranges from about 0.3 inches to about 0.4 inches—including all distances and sub-ranges there-between. In some embodiments, the first inset distance $D_{I1}$ for the mounting flange 210 may range from about 0.325 inches to about 0.375 inches—including all distances and sub-ranges there-between.

The keyhole 220 of the mounting flange 210 may be inset from the second edge 215 of the perimeter 213 by a second inset distance $D_{I2}$ that ranges from about 0.2 inches to about 0.3 inches—including all distances and sub-ranges there-between. In some embodiments, the second inset distance $D_{I2}$ for the mounting flange 220 may range from about 0.225 inches to about 0.275 inches—including all distances and sub-ranges there-between.

The keyhole 220 for the mounting flange 210 may be inset from the third edge 216 of the perimeter 213 by a third inset distance $D_{I3}$ that ranges from about 1.0 inches to about 1.2 inches—including all distances and sub-ranges there-between. In some embodiments, the third inset distance $D_3$ for the mounting flange 210 may range from about 1.05 inches to about 1.15 inches—including all distances and sub-ranges there-between.

The keyhole 220 for the mounting flange 210 may be inset from the fourth edge 217 of the perimeter 213 by a fourth inset distance $D_{I4}$ that ranges from about 0.75 inches to about 0.9 inches—including all distances and sub-ranges there-between. In some embodiments, the fourth inset distance $D_{I4}$ for the mounting flange 210 may range from about 0.8 inches to about 0.85 inches—including all distances and sub-ranges there-between.

The at least one mounting hole 230 may comprise a first mounting hole 230a. The first mounting hole 230a may be inset from the first edge 214 of the perimeter 213 by a fifth inset distance $D_{I5}$ that ranges from about 0.45 inches to about 0.55 inches—including all distances and sub-ranges there-between. In some embodiments, the fifth inset distance $D_{I5}$ may be about 0.5 inches.

The first mounting hole 230a may be inset from the second edge 215 of the perimeter 213 by a sixth inset distance $D_{I6}$ that ranges from about 0.35 inches to about 0.45 inches—including all distances and sub-ranges there-between. In some embodiments, the sixth inset distance $D_{I6}$ may be about 0.41 inches.

The first mounting hole 230a may be inset from the third edge 216 of the perimeter 113 by a seventh inset distance $D_{I7}$ that ranges from about 0.35 inches to about 0.45 inches—including all distances and sub-ranges there-between. In some embodiments, the sixth inset distance $D_{I7}$ may be about 0.39 inches—including all distances and sub-ranges there-between.

The first mounting hole 230a may be inset from the keyhole 220 by an eighth inset distance $D_{I8}$ that ranges from about 0.55 inches to about 0.66 inches—including all distances and sub-ranges there-between. In some embodiments, the eighth inset distance $D_{I8}$ may about 0.61 inches.

In some embodiments, the at least one mounting hole 230 may comprise a second mounting hole 230b. The second mounting hole 230b may be inset from the first edge 214 of the perimeter 213 by a ninth inset distance $D_{I9}$. In some embodiments, the ninth inset distance $D_{I9}$ may be substantially equal to the fifth inset distance Dis. The second mounting hole 230b may be inset from the second edge 215 of the perimeter 213 by a tenth inset distance $D_{I10}$. In some embodiments, the tenth inset distance $D_{I10}$ may be substantially equal to the sixth inset distance $D_{I6}$.

The second mounting hole 230b may be inset from the fourth edge 217 of the perimeter 213 by a eleventh inset distance $D_{I11}$ that ranges from about 0.15 inches to about 0.25 inches—including all distances and sub-ranges there-between. In some embodiments, the eleventh inset distance $D_{I11}$ may be about 0.2 inches.

The second mounting hole 230b may be inset from the keyhole 220 by an twelfth inset distance $D_{I12}$ that ranges from about 0.55 inches to about 0.66 inches—including all distances and sub-ranges there-between. In some embodiments, the eighth inset distance $D_{I12}$ may about 0.61 inches.

The inner wall 244a of the vertical portion 244 of the first alignment tab 240a and the inner wall 244a of the vertical portion 244 of the second alignment tab 240b may be horizontally offset by a fourth tab distance $D_{T4}$ as measured along the X-axis. The fourth tab distance $D_{T4}$ may be a non-zero positive value. The fourth tab distance $D_{T4}$ may range from about 0.7 inches to about 1.3 inches—including all distances and sub-ranged there-between.

A ratio of the fourth tab distance $D_{T4}$ to the fifth tab distance $D_{T5}$ of the mounting clip 200 may range from about 0.3:1 to about 0.55:1—including all ratios and sub-ranges there-between. In some embodiments, the ratio of the fourth tab distance $D_{T4}$ to the fifth tab distance $D_{T5}$ of the mounting clip 200 may range from about 0.4:1 to about 0.45:1—including all ratios and sub-ranges there-between.

In some embodiments, the ratio of the fourth tab distance $D_{T4}$ to the fifth tab distance $D_{T5}$ may range from about 0.35:1 to about 0.5:1 for the mounting clip 200—including all ratios and sub-ranges there-between. In some embodiments, the ratio of the fourth tab distance $D_{T4}$ to the fifth tab distance $D_{T5}$ may range from about 0.35:1 to about 0.45:1 for the mounting clip 200—including all ratios and sub-ranges there-between.

Referring now to FIGS. 13-18, 26, and 27, the present invention further includes a mounting key 400. The mounting key 400 may be formed of a metal. Non-limiting examples of metals include steel, aluminum, and tin. In other embodiments, the mounting key 400 may be formed of plastic. The mounting key 400 may comprise a mounting tab 410 and a mounting spacer 450.

The mounting tab 410 may comprise an upper surface 411 opposite a lower surface 412 and a side surface 413 extending between the upper surface 411 and the lower surface 412. The upper surface 411 and the lower surface 412 of the mounting tab 410 may be substantially planer. The upper surface 411 and the lower surface 412 of the mounting tab 410 may be substantially parallel.

The mounting tab 410 may further comprise a through-hole 420 that extends continuously between the upper surface 411 and the lower surface 412 of the mounting tab 410. The through-hole 420 may be continuously circumscribed by a through-hole wall 421. The through-hole 420 may comprise a diameter $D_{MT}$ ranging from about 0.15 inches to about 0.21 inches—including a diameters and sub-ranges there-between. The diameter $D_{MT}$ of the through-hole 420 of the mounting tab 410 may be substantially constant.

The mounting tab 410 may comprise a mounting tab length $L_{MT}$ and a mounting tab width $W_{MT}$. The mounting tab length $L_{MT}$ may be greater than the mounting tab width $W_{MT}$. The mounting tab length $L_{MT}$ may range from about 0.7 inches to about 0.9 inches—including all lengths and sub-ranges there-between. The mounting tab width $W_{MT}$ may range from about 0.3 inches to about 0.45 inches—including all lengths and sub-ranges there-between. A ratio of the mounting tab length $L_{MT}$ to the mounting tab width $W_{MT}$ may range from about 1.5:1 to about 2.5:1—including all ratios and subranges there-between. In some embodiments, the ratio of the mounting tab length $L_{MT}$ to the mounting tab width $W_{MT}$ may range from about 1.9:1 to about 2.3:1—including all ratios and subranges there-between.

In some embodiments, the mounting tab 410 may be discorectangle in shape. The side surface 413 of the mounting tab 410 may comprise a first major edge 414 opposite a second major edge 415. The first major edge 414 may be a first longitudinal edge and the second major edge 415 may be a second longitudinal edge. The side surface 413 of the mounting tab 410 may comprise a first transverse edge 416 opposite a second transverse edge 417. In some embodiments, the first transverse edge 416 and the second transverse edge 417 may be rounded. The rounded first and second transverse edges 416, 417 may have a constant radius that is substantially equal to half of the mounting tab width $W_{MT}$. In some embodiments, the first major edge 414 and the second major edge 415 may be linear. The first and second edges 414, 415 that are linear may be parallel and be separated by a constant distance that is equal to the mounting tab width $W_{MT}$.

The mounting tab 410 may comprise a mounting tab thickness $t_{MT}$ as measured between the upper surface 411 and the lower surface 412 of the mounting tab 410. The mounting tab thickness $t_{MT}$ may range from about 0.05 inches to about 0.15 inches—including all thickness and sub-ranges there-between. In some embodiments, the mounting tab thickness $t_{MT}$ may be about 0.9 inches.

The mounting spacer 450 may comprise an upper surface 451 opposite a lower surface 452 and a side surface 453 extending between the upper surface 451 and the lower surface 452. The upper surface 451 and the lower surface 452 of the mounting spacer 450 may be substantially planer. The upper surface 451 and the lower surface 452 of the mounting spacer 450 may be substantially parallel.

The mounting spacer 450 may further comprise a through-hole 460 that extends continuously between the upper surface 451 and the lower surface 452 of the mounting spacer 450. The through-hole 460 may be continuously circumscribed by a through-hole wall 461. The through-hole 460 may comprise a diameter $D_{STH}$ ranging from about 0.15 inches to about 0.21 inches—including a diameters and sub-ranges there-between. The diameter $D_{STH}$ of the through-hole 460 of the mounting spacer 450 may be substantially equal to the diameter $D_{MT}$ of the through-hole 420 of the mounting tab 410. The diameter $D_{STH}$ of the through-hole 460 of the mounting spacer 450 may be substantially constant.

The mounting spacer 450 may comprise a mounting spacer diameter $D_{MS}$. The mounting spacer diameter $D_{MS}$ may range from about 0.4 inches to about 0.6 inches—including all lengths and sub-ranges there-between. The mounting tab length $L_{MT}$ may be greater than the mounting spacer diameter $D_{MS}$. The mounting spacer diameter $D_{MS}$ may be greater than the mounting tab width $W_{MT}$.

A ratio of the mounting tab length $L_{MT}$ to the mounting spacer diameter $D_{MS}$ may range from about 1.1:1 to about 2.1:1—including all ratios and subranges there-between. In some embodiments, the ratio of the mounting tab length $L_{MT}$ to the mounting spacer diameter $D_{MS}$ may range from about 1.4:1 to about 1.8:1—including all ratios and subranges there-between. A ratio of the mounting tab width $W_{MT}$ to the mounting spacer diameter $D_{MS}$ may range from about 0.5:1 to about 0.9:1—including all ratios and subranges there-between. In some embodiments, the ratio of the mounting tab length $L_{MT}$ to the mounting spacer diameter $D_{MS}$ may range from about 0.7:1 to about 0.8:1—including all ratios and subranges there-between.

The mounting spacer 450 may comprise a mounting spacer thickness $t_{MS}$ as measured between the upper surface 451 and the lower surface 452 of the mounting spacer 450. The mounting spacer thickness $t_{MS}$ may range from about 0.05 inches to about 0.15 inches—including all thickness and sub-ranges there-between. In some embodiments, the mounting spacer thickness $t_{MS}$ may be about 0.9 inches. The mounting spacer thickness $t_{MS}$ may be substantially equal to the mounting tab thickness $t_{MT}$.

In some embodiments, the mounting tab 410 and the mounting spacer 420 may be formed of separate components. In some embodiments, the mounting tab 410 and the mounting spacer 420 may be formed of separate bodies.

Referring now to FIGS. 19-25, a mounting key 500 is illustrated in accordance with another embodiment of the present invention. The mounting key 500 is similar to the mounting key 400 except as described herein below. The description of the mounting key 400 above generally applies to the mounting key 500 described below except with regard to the differences specifically noted below. A similar numbering scheme will be used for the mounting key 500 as with the mounting key 400 except that the 500-series of numbers will be used.

The mounting key 500 may comprise a mounting tab 510 and a mounting spacer 550. The mounting tab 510 may comprise a central region 530 and at least one wing region 540. In some embodiments, the mounting tab 510 may comprise a first wing 540a and a second wing 540b arranged opposite of each other about the central region 530.

The central region 530 may comprise the first major edge 514 and the second major edge 515. 13 such that the first major edge 514 and the second major edge 515 have a radius of curvature that is half the diameter $D_{CR}$ of the central region 530. The diameter $D_{CR}$ of the central region 530 may range from about 0.4 inches to about 0.6 inches—including all diameters and sub-ranges there-between. In some embodiments, the diameter $D_{CR}$ of the central region 530 is about 0.5 inches.

The at least one wing region 550 may form the first transverse edge 516 of the mounting tab 510. The at least one wing region 550 may form the second transverse edge 517 of the mounting tab 510. In some embodiments, the first wing 540a may form the first transverse edge 516 and the second wing 540b may for the second transverse edge 540a. The at least one wing region 550 may extend laterally from the central region 530 by a distance $D_{WR}$ that is measured from the respective transverse edge 516, 517 to the central region 530. The distance $D_{WR}$ of the at least one wing region 550 may range from about 0.1 inches to about 0.15 inches—including all distances and sub-ranges there-between. In some embodiments, the distance $D_{WR}$ of the at least one wing region 550 may be about 0.13. The at least one wing region 550 may have a width that is substantially equal to the mounting tab width $W_{MT}$.

A ratio of the diameter $D_{CR}$ of the central region 530 to the mounting tab width $W_{MT}$ for the mounting key 500 may range from about 1.1:1 to about 1.5:1—including all ratios and sub-ranges there-between. In some embodiments, the ratio of the diameter $D_{CR}$ of the central region 530 to the mounting tab width $W_{MT}$ for the mounting key 500 may range from about 1.3:1 to about 1.4:1—including all ratios and sub-ranges there-between.

A ratio of the diameter $D_{CR}$ of the central region 530 to the mounting tab length $L_{MT}$ for the mounting key 500 may range from about 0.5:1 to about 0.7:1—including all ratios and sub-ranges there-between. In some embodiments, the ratio of the diameter $D_{CR}$ of the central region 530 to the mounting tab length $L_{MT}$ for the mounting key 500 may range from about 0.6:1 to about 0.65:1—including all ratios and sub-ranges there-between.

A ratio of the diameter $D_{CR}$ of the central region 530 to the distance $D_{WR}$ of the wing region 540 for the mounting key 500 may range from about 3:1 to about 5:1—including all ratios and sub-ranges there-between. In some embodiments, the ratio of the diameter $D_{CR}$ of the central region 530 to the distance $D_{WR}$ of the wing region 540 for the mounting key 500 may range from about 3.5:1 to about 4.5:1—including all ratios and sub-ranges there-between.

The upper surface 511 of the at least one wing region 540 may substantially planar. The lower surface 512 of the at least one wing region 5440 may be substantially planar. The upper surface 511 and the lower surface 512 of the at least one wing region 540 may be substantially parallel.

The upper surface 511 of the central region 530 may be concave in shape. The lower surface 512 of the central region 530 may be convex in shape. The concave shape of the central region 530 on the upper surface 511 may create a countersink geometry for a head of fastener to sit—as discuss in greater detail herein. The upper surface 511 and the lower surface 512 of the central region 530 may form parallel curves. The concave geometry of the upper surface 511 of the central region 530 may result in the diameter $D_{MT}$ of the through-hole 520 of the mounting tab 510 to be non-constant. In some embodiments, the diameter $D_{MT}$ of the through-hole 520 of the mounting tab 510 may range from about 0.45 to about 0.6 inches at measured at the upper surface 511 of the mounting tab 510—including all diameters and sub-ranges there-between—and reduce to a diameter $D_{MT}$ ranging from about 0.15 inches to about 0.21 inches as measured at the lower surface 512 of the mounting tab 510—including a diameters and sub-ranges there-between. The through-hole 560 of the mounting spacer 550 may be substantially constant.

The side surface 553 of the mounting spacer 550 may be convex in shape. The convex shape of the side surface 553 of the mounting spacer 550 may extend continuously from the convex shape of the lower surface 512 of the mounting tab 510. The side surface 553 of the mounting spacer 550 may extend continuously into the lower surface 552 of the mounting spacer 550. The through-hole wall 521 of the mounting tab 520 may also be concave in shape and extend continuously from the upper surface 511 of the mounting tab 510 to the upper surface 551 of the mounting spacer 550. The upper surface 551 of the mounting spacer 550 may be substantially planer. The lower surface 552 of the mounting spacer 550 may be substantially parallel. The upper surface 551 and the lower surface 552 of the mounting spacer 550 may be substantially parallel.

In some embodiments, the mounting tab 510 and the mounting spacer 520 may be integrally formed from a single body.

The mounting tab length $L_{MT}$ of the mounting tab 410 may be greater than the diameter of may be greater than the first diameter $D_{K1}$ of the central opening portion 123 of the keyhole 120 of the mounting clip 100. A ratio of the mounting tab length $L_{MT}$ to the first diameter $D_{K1}$ may range from about 1.1:1 to about 2.0:1—including all ratios and sub-ranges there-between. In some embodiments, the ratio of the mounting tab length $L_{MT}$ to the first diameter $D_{K1}$ may range from about 1.4:1 to about 1.6:1—including all ratios and sub-ranges there-between. The foregoing ratios also independently apply to each of the mounting key 500 and the mounting clip 200.

The mounting tab width $W_{MT}$ of the mounting tab 410 may be less than the diameter of may be greater than the first diameter $D_{K1}$ of the central opening portion 123 of the keyhole 120 of the mounting clip 100. A ratio of the mounting tab width $W_{MT}$ to the first diameter $D_{K1}$ may range from about 0.5:1 to about 0.9:1—including all ratios and sub-ranges there-between. In some embodiments, the ratio of the mounting tab width $W_{MT}$ to the first diameter $D_{K1}$ may range from about 0.6:1 to about 0.7:1—including all ratios and sub-ranges there-between. The foregoing ratios also independently apply to each of the mounting key 500 and the mounting clip 200.

The mounting tab width $W_{MT}$ of the mounting tab 410 may be less than the second diameter $D_{K2}$ of the at least one slot opening portion 124 of the keyhole 120 of the mounting clip 100. A ratio of the mounting tab width $W_{MT}$ to the second diameter $D_{K2}$ may range from about 0.8:1 to about 0.95:1—including all ratios and sub-ranges there-between. In some embodiments, the ratio of the mounting tab width $W_{MT}$ to the second diameter $D_{K2}$ may range from about 0.9:1 to about 0.95:1—including all ratios and sub-ranges there-between. The foregoing ratios also apply to the mounting key 500 and the mounting clip 200.

The mounting spacer diameter $D_{MS}$ of the mounting spacer 450 may be less than the first diameter $D_{K1}$ of the central opening portion 123 of the keyhole 120 of the mounting clip 100. A ratio of the mounting spacer diameter $D_{MS}$ to the first diameter $D_{K1}$ may range from about 0.85:1 to about 0.95:1—including all ratios and sub-ranges there-between. In some embodiments, the ratio of the mounting spacer diameter $D_{MS}$ to the first diameter $D_{K1}$ may range from about 0.9:1 to about 0.95:1—including all ratios and sub-ranges there-between. The foregoing ratios also apply to the mounting key 500 and the mounting clip 200.

The mounting spacer thickness $t_{MS}$ may be equal to or greater than the thickness $t_{MF}$ of the mounting flange 110 of the mounting clip 100. The foregoing ratios also apply to the mounting key 500 and the mounting clip 200.

Figure 33:
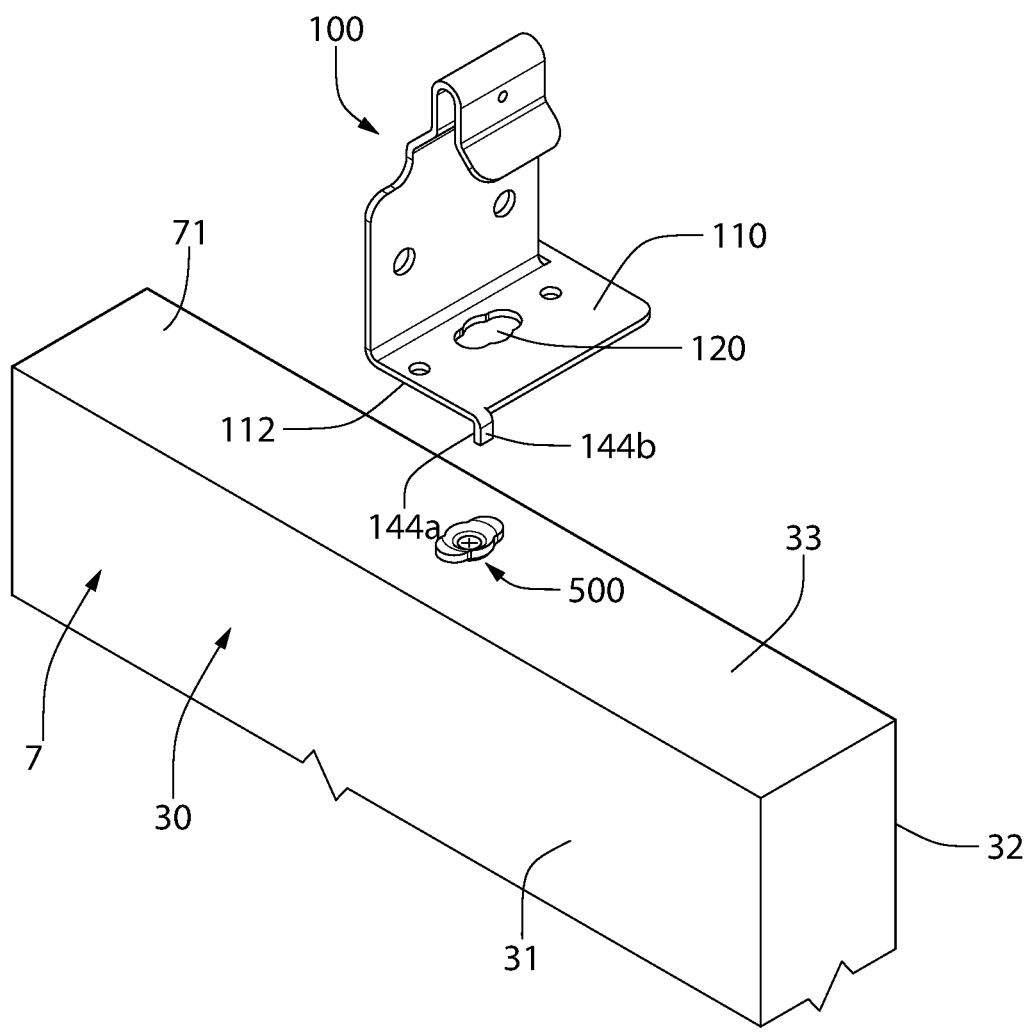
Figure 34:
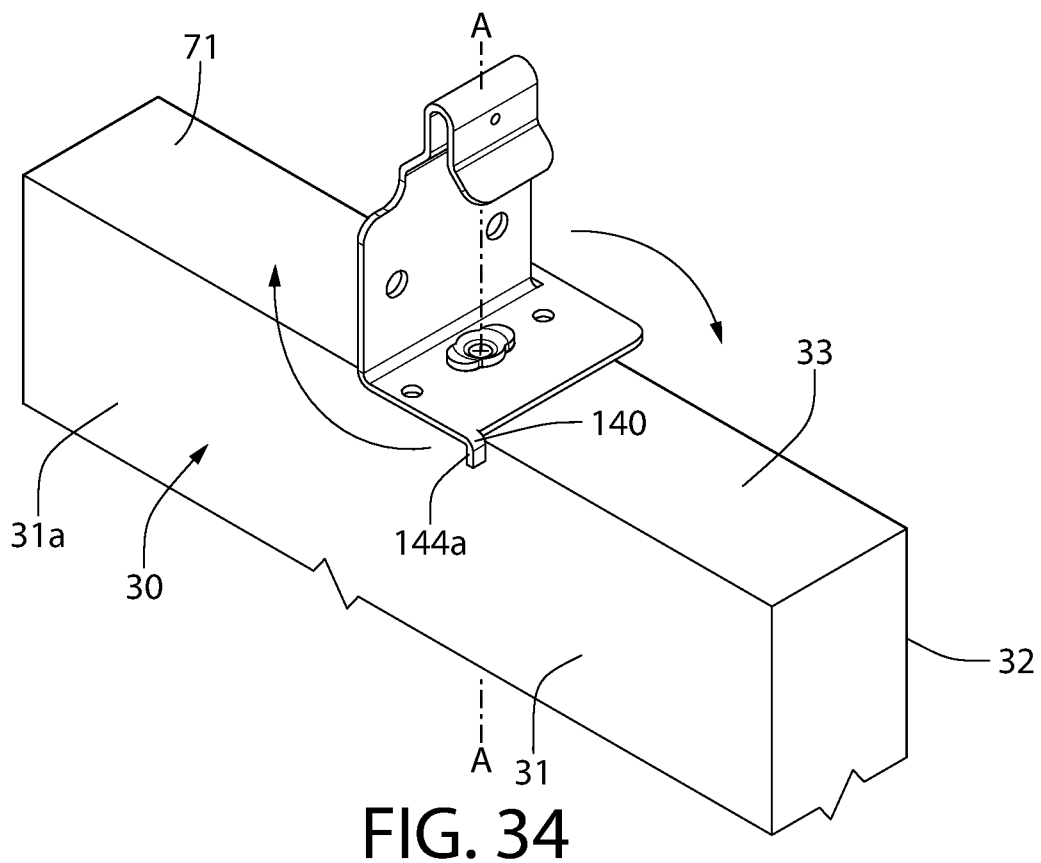
Figure 38:
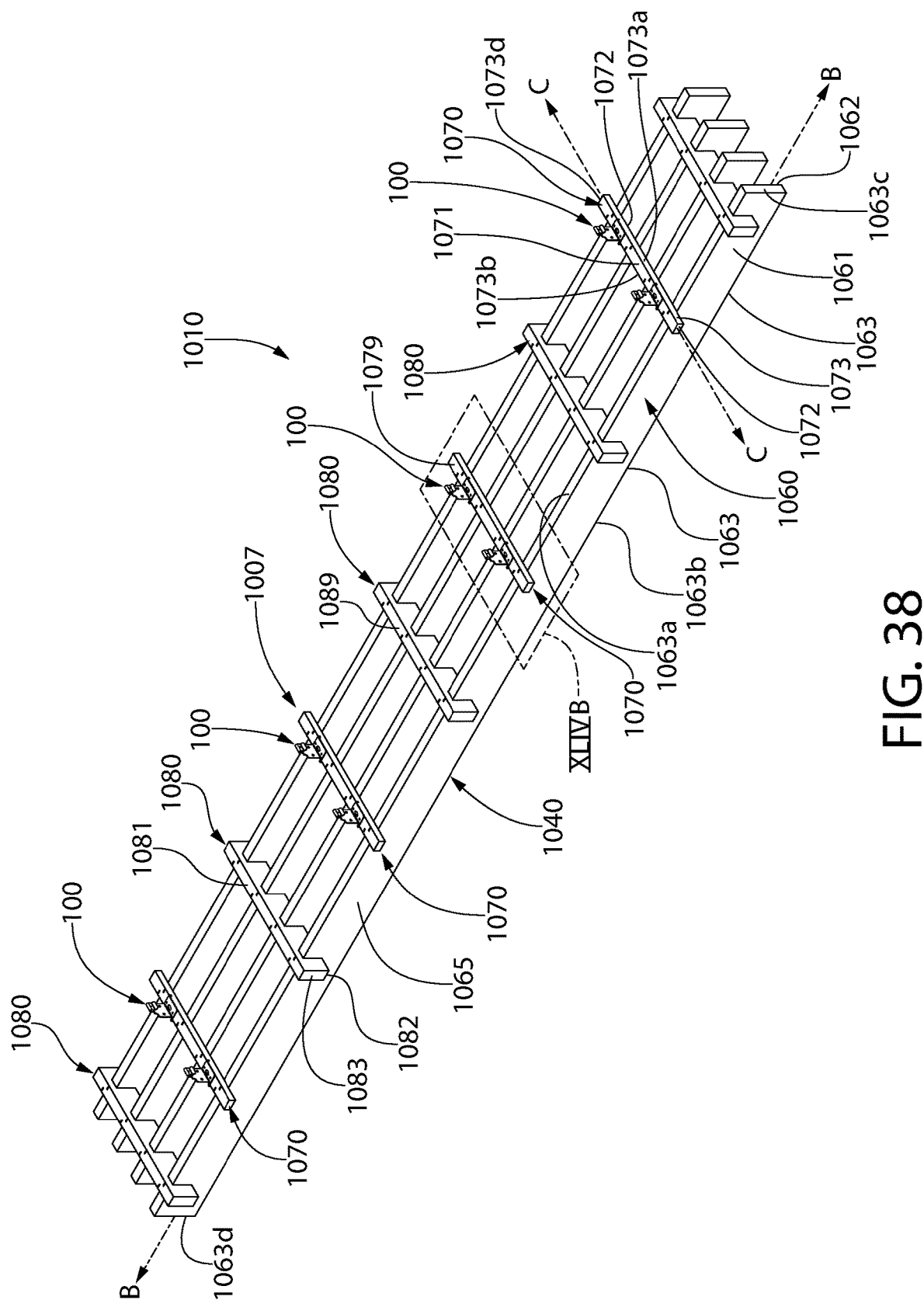
FIG. 38 is a panel assembly according to another embodiment of the present invention.

Referring now to FIGS. 33 and 38, the present invention may further comprise a kit 90—the kit 90 comprising one or more of the mounting clip 100, 200 and one or more of the mounting key 400, 500.

Referring now to FIGS. 26-30, a panel assembly 10 and method of forming the panel assembly 10 is shown. The following will specifically reference the panel assembly 10 shown in FIGS. 26-30, but the discussion also applies to the panel assembly 10 shown in FIGS. 31-35 with reference to the mounting key 500. Additionally, although not shown, the following discussion also applies to the mounting clip 200 used in combination with one of the mounting key 400 or the mounting key 500.

The panel assembly 10 may comprise a panel 30, at least one mounting clip 100, and at least one mounting key 400. The panel 30 may comprise a body 39 and have a first major surface 31 opposite a second major surface 32 and a side surface 33 extending between the first major surface and the second major surface. The first major surface 31 and the second major surface 32 of the panel 30 may be substantially parallel. The side surface 33 may be substantially orthogonal to the first and second major surface 31, 32 of the panel 30. The side surface 33 of the panel 30 may comprise an upper surface 71. The side surface 33 of the panel 30 may comprise a lower surface 72 that is opposite the upper surface 71 of the side surface 33 of the panel 30.

The body 39 of the panel 30 may be formed of a cellulosic material, a fibrous material, a polymeric material, a composite material, or a metallic material. Non-limiting examples of cellulosic material include wooden bodies.

The panel 30 may have a thickness $t_P$ as measured between the first major surface 31 and the second major surface 32. The thickness $t_P$ of the panel 30 may be less than the fourth tab distance $D_{T4}$ of the mounting clip 100. In a non-limiting embodiment, the thickness $t_P$ of the panel 30 may range from about 0.75 inches to about 2.1 inches. In some embodiments, the fourth tab distance $D_{T4}$ may be equal to about 101% to about 110% the thickness $t_P$ of the panel 30—including all percentages and sub-ranges there-between.

In the panel assembly 10, the bottom surface 112 of the mounting flange 110 may be adjacent the upper surface 71 of the side surface 33 of the panel 30. In some embodiments, the bottom surface 112 of the mounting flange 110 may contact the upper surface 71 of the side surface 33 of the panel 30.

In the panel assembly 10, at least one alignment tab 140 of the mounting clip 100 may be adjacent to one of the first major surface 31 or the second major surface 32 of the panel 30. In some embodiments, the at least one alignment tab 140 of the mounting clip 100 may be in contact with one of the first major surface 31 or the second major surface 32 of the panel 30.

In the panel assembly 10, the vertical portion 144 of at least one alignment tab 140 of the mounting clip 100 may be adjacent to one of the first major surface 31 or the second major surface 32 of the panel 30. In some embodiments, the vertical portion 144 at least one alignment tab 140 of the mounting clip 100 may be in contact with one of the first major surface 31 or the second major surface 32 of the panel 30.

In the panel assembly 10, the inner wall 144a of the vertical portion 144 of at least one alignment tab 140 of the mounting clip 100 may be adjacent to one of the first major surface 31 or the second major surface 32 of the panel 30. In some embodiments, the inner wall 144a of the vertical portion 144 at least one alignment tab 140 of the mounting clip 100 may be may contact with one of the first major surface 31 or the second major surface 32 of the panel 30.

In the panel assembly 10, at least one alignment tab 140 of the mounting clip 100 may be adjacent to the upper surface 71 of the side surface 33 of the panel 30. In some embodiments, the at least one alignment tab 140 of the mounting clip 100 may be contact with the upper surface 71 of the side surface 33 of the panel 30.

In the panel assembly 10, the horizontal portion 143 of at least one alignment tab 140 of the mounting clip 100 may be adjacent to the upper surface 71 of the side surface 33 of the panel 30. In some embodiments, the horizontal portion 143 of at least one alignment tab 140 of the mounting clip 100 may be in contact with the upper surface 71 of the side surface 33 of the panel 30.

In the panel assembly 10, the inner wall 143a of the horizontal portion 143 of at least one alignment tab 140 of the mounting clip 100 may be adjacent to the upper surface 71 of the side surface 33 of the panel 30. In some embodiments, the inner wall 143a of the horizontal portion 143 at least one alignment tab 140 of the mounting clip 100 may be in contact with the upper surface 71 of the side surface 33 of the panel 30.

In a non-limiting embodiment, the panel assembly 10 comprising the mounting clip 100 having a first alignment tab 140a and a second alignment tab 140b may comprise the first alignment tab 140a located adjacent to the second major surface 32 of the panel and the second alignment tab 140b located adjacent to the first major surface 31 of the panel 30. The first alignment tab 140a may be partially located adjacent to the upper surface 71 of the side surface 33 of the panel 30.

In such embodiment, the vertical portion 144 of the first alignment tab 140a may be located adjacent to the second major surface 32 of the panel and the vertical portion 144 of the second alignment tab 140b located adjacent to the first major surface 31 of the panel 30. The horizontal portion 143 of the first alignment tab 140a may also be partially located adjacent to the upper surface 71 of the side surface 33 of the panel 30. In such embodiment, the vertical portion 144 of the first alignment tab 140a may contact the second major surface 32 of the panel 30. The vertical portion 144 of the second alignment tab 140b may contact the first major surface 31 of the panel 30. The horizontal portion 143 of the first alignment tab 140a may contact the upper surface 71 of the side surface 33 of the panel 30.

In such embodiment, the inner wall 144a of the vertical portion 144 of the first alignment tab 140a may be located adjacent to the second major surface 32 of the panel and the inner wall 144a of the vertical portion 144 of the second alignment tab 140b located adjacent to the first major surface 31 of the panel 30. The inner wall 143a of the horizontal portion 143 of the first alignment tab 140a may be partially located adjacent to the upper surface 71 of the side surface 33 of the panel 30. In such embodiment, the inner wall 144a of the vertical portion 144 of the first alignment tab 140a may contact the second major surface 32 of the panel 30. The inner wall 144a of the vertical portion 144 of the second alignment tab 140b may contact to the first major surface 31 of the panel 30. The inner wall 143a of the horizontal portion 143 of the first alignment tab 140a may contact the upper surface 71 of the side surface 33 of the panel 30.

The mounting key 400 may be at least partially located within the keyhole 120 of the mounting clip 100. Specifically, the mounting spacer 450 may be positioned within the keyhole 120 of the mounting flange 110. The keyhole wall 121 may at least partially circumscribe the mounting spacer 450. The side surface 453 of the mounting spacer 450 may overlap with the keyhole wall 121 along each of the X-axis and Y-axis. The lower surface 452 of the mounting spacer 450 may be adjacent to the upper surface 71 of the side surface 33 of the panel 30. The lower surface 452 of the mounting spacer 450 may contact the upper surface 71 of the side surface 33 of the panel 30.

The mounting tab 410 may be located above the mounting flange 110 of the mounting clip 100. The mounting tab 410 may exist entirely outside of the keyhole 120 of the mounting flange 110 such that the side surface 413 of the mounting tab 410 and the keyhole wall 121 do not overlap along the X-axis and Y-axis. The lower surface 412 of the mounting tab 410 may be adjacent to the top surface 111 of the mounting flange 110. The lower surface 412 of the mounting tab 410 may contact the top surface 111 of the mounting flange 110.

According to the embodiments where the mounting key 500 comprises at least one or more wing region 540, at least a portion of the one or more wing region 540 may overlap with the mounting flange 110 when viewed along the Z-axis. The lower surface 512 of the one or more wing region 540 may at least be partially adjacent to the top surface 111 of the mounting flange 110. The lower surface 512 of the one or more wing region 540 may contact the top surface 111 of the mounting flange 110.

In a non-limiting embodiment, the first transverse edge 416 of the mounting tab 410 may overlap the top surface 111 of the mounting flange 110 and the first major edge 414 and the second major edge 415 may at least partially overlap with the keyhole 120 along the Z-axis.

The panel assembly may comprise one or more fasteners 50. A first fastener 51 may extend through the through-hole 420 of the mounting tab 410 and the through-hole 460 of the mounting spacer 450. The first fastener 51 may extend into the body 39 of the panel 30, thereby securing the mounting key 40 to the panel 30.

The panel assembly may comprise a second fastener 52 that may extend through the mounting hole 130 present on the mounting flange 110 thereby securing the mounting clip 100 to the panel 30. The second fastener 52 may extend through the mounting hole 130 present on the mounting flange 110 and into the upper surface 71 of the side surface 33 of the panel 30, thereby securing the mounting clip 100 to the panel 30.

The fastener 50 may comprise a head 50a and a shaft 50b. The head 50a of the first fastener 51 may be located above the upper surface 71 of the side surface 33 of the panel 30. The head 50a of the first fastener 51 may at least partially overlap with the mounting key 500 along the X-axis and the Y-axis. In other embodiments, the head 50a of the first fastener 51 may be located above the top surface 411 of the mounting tab 410. The shaft 50b of the first fastener 51 may overlap with the body 39 of the panel 30 along the X-axis and the Y-axis. At least a portion of the head of the first fastener 51 may be located above the bottom surface 112 of the mounting flange 110 of the mounting clip 100.

The head 50a of the second fastener 52 may be located above the upper surface 71 of the side surface 33 of the panel 30. The head 50a of the second fastener 52 may at least partially overlap with the mounting flange 110 along the X-axis and the Y-axis. In other embodiments, the head 50a of the second fastener 52 may be located above the top surface 111 of the mounting flange 110. The shaft 50b of the second fastener 52 may overlap with the body 39 of the panel 30 along the X-axis and the Y-axis. At least a portion of the head 50 of the second fastener 52 may be located above the bottom surface 112 of the mounting flange 110 of the mounting clip 100.

The panel assembly 10 may be assembled by first providing at least one mounting clip 100 and at least one pre-assembled mountable panel 7. The pre-assembled mountable panel 7 may comprise at least one panel 30 and at least one mounting key 400 coupled to the panel 30 by fastener 50. The pre-assembled mountable panel 7 may be factory-formed (i.e., comes as a pre-assembled unit that does not require assembly in the field at the time of installation). Such factory-formed pre-assembled mountable panel 7 may ensure precise location and spacing of the mounting clip 100 on the panel assembly 10.

The mounting key 400 may be coupled to the panel 30 such that the first transverse edge 416 is adjacent to the first major surface 31 of the panel and the second transverse edge 417 is adjacent to the second major surface 32 of the panel 30.

The mounting clip 100 may be then be aligned with the pre-assembled mountable panel 7 such that the mounting key 400 and the keyhole 120 of the mounting clip substantially 100 overlap. Specifically, the mounting clip 100 may be oriented relative to the pre-assembled mountable panel 7 such that the transverse edges 416, 417 of the mounting tab 410 overlap with the slot opening portion 124 of the keyhole 120 along the Z-axis.

Subsequently the pre-assembled mountable panel 7 and the mounting clip 100 may be brought together in a direction substantially parallel to the Z-axis such that the mounting tab 410 of the mounting key 400 on the pre-assembled mountable panel 7 enters and passes through the keyhole 120. The pre-assembled mountable panel 7 and the mounting clip 100 may be brought together in a direction substantially parallel to the Z-axis such that the mounting tab 410 of the mounting key 400 passes the bottom surface 112 of the mounting flange, passes the keyhole wall 121 of the keyhole 120 and exits the keyhole 120 passing the top surface 111 of the mounting flange 110 of the mounting clip 100.

As the mounting clip 100 and the pre-assembled mountable panel 7 are brought together in a direction along the Z-axis, and once the mounting tab 410 passes through the keyhole 120, the mounting spacer 450 may subsequently enter the keyhole 120. The mounting clip 100 and the pre-assembled mountable panel 7 may continue to move relative to each other along the Z-axis until the bottom surface 112 of the mounting flange 110 contacts the upper surface 71 of the side surface 33 of the ceiling panel 30.

Figure 29:
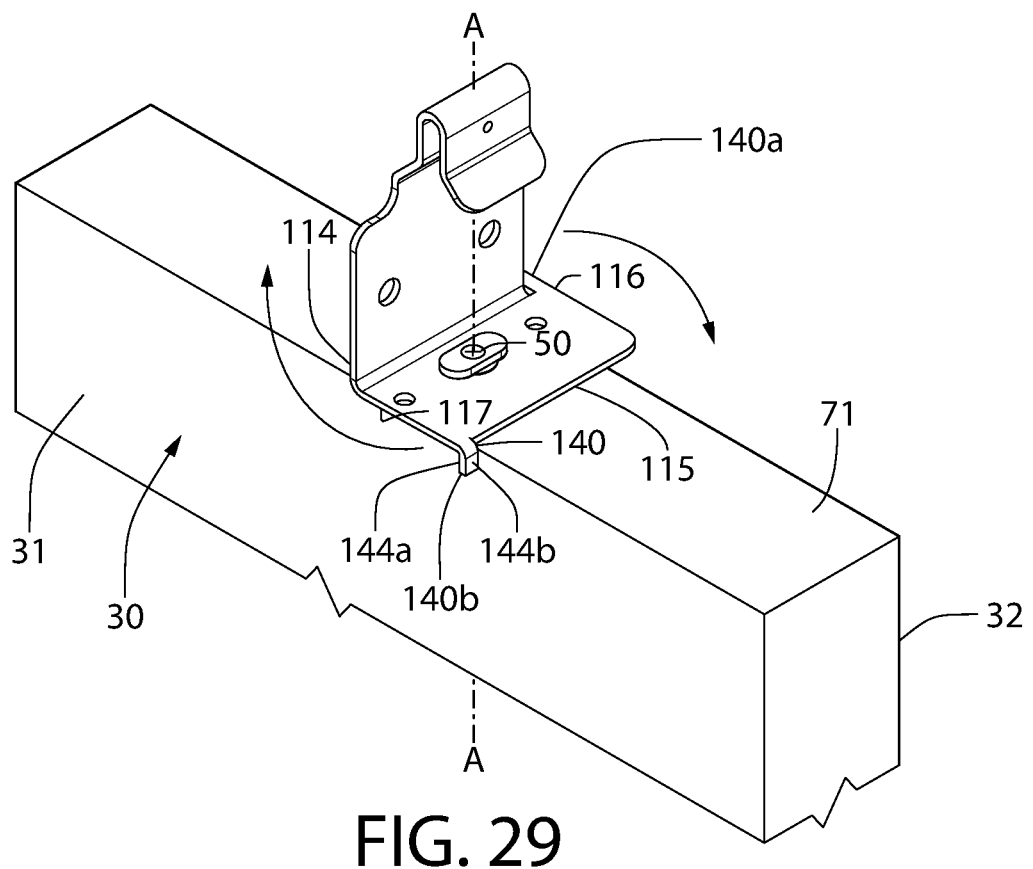
Figure 30:
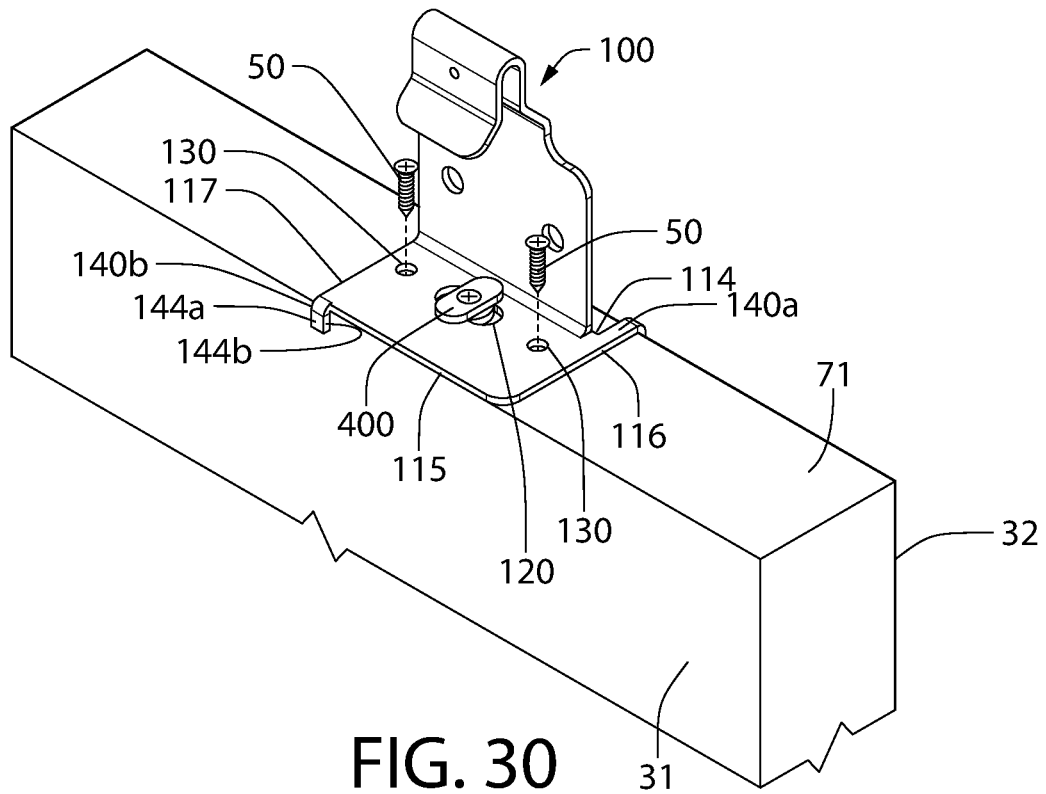
Figure 31:
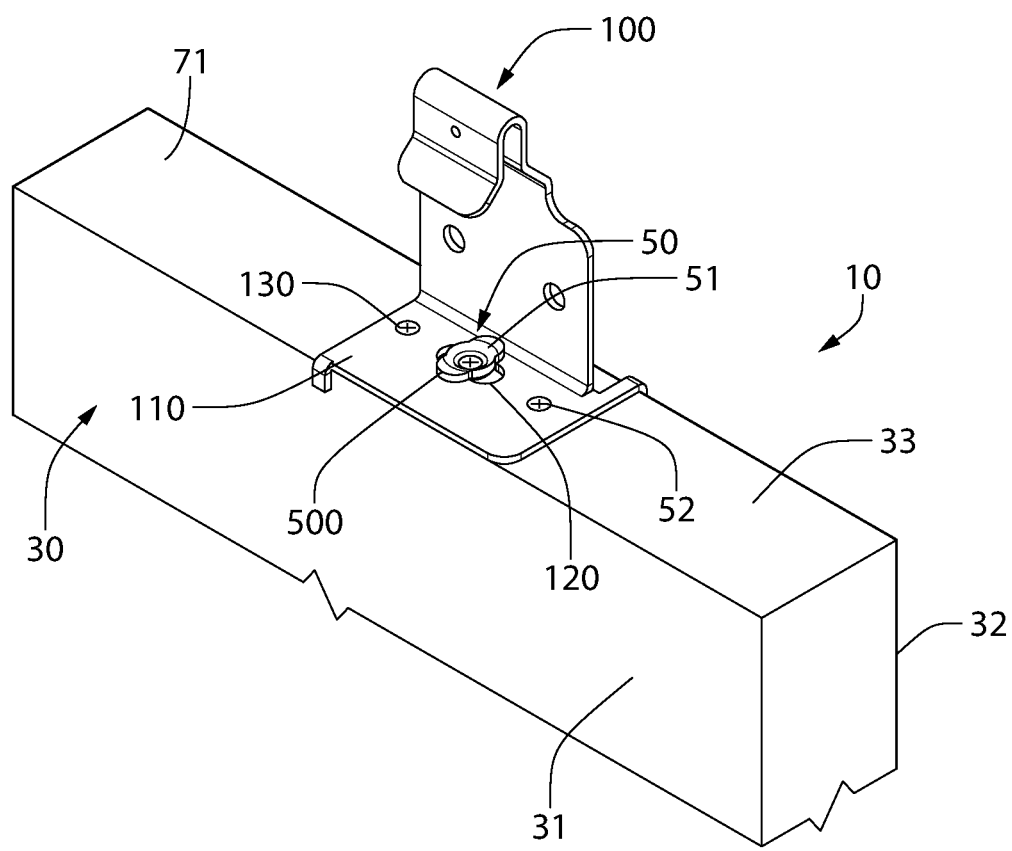
Figure 32:
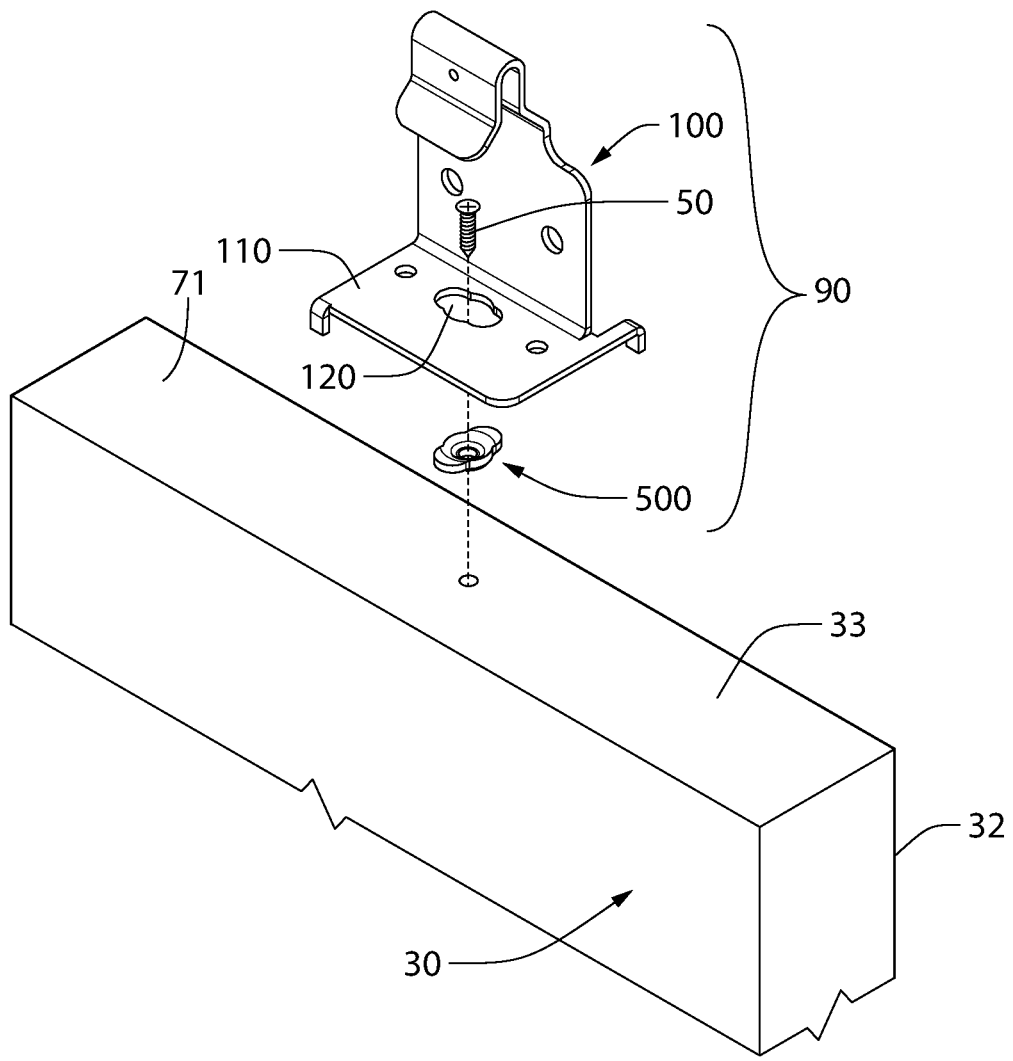

Immediately after the mounting tab 410 is inserted through the keyhole 120 of the mounting flange and before any rotation (as shown in FIG. 29 before rotating about direction indicated through arrows), the at least one alignment tab 140 may not be in contact with the panel 30. In some embodiments, the inner wall 144a of the vertical portion 144 of the alignment tab 140 may not be in contact with the first major surface 31 and/or the second major surface 32 of the panel 30. In some embodiments, the inner wall 143a of the horizontal portion 143 of the alignment tab 140 may not be in contact with the upper surface 71 of the side surface 33 of the panel 30. In some embodiments, the inner wall 144a of the vertical portion 144 of the alignment tab 140 may not be parallel to the first major surface 31 and/or the second major surface 32 of the panel 30.

Figure 35:
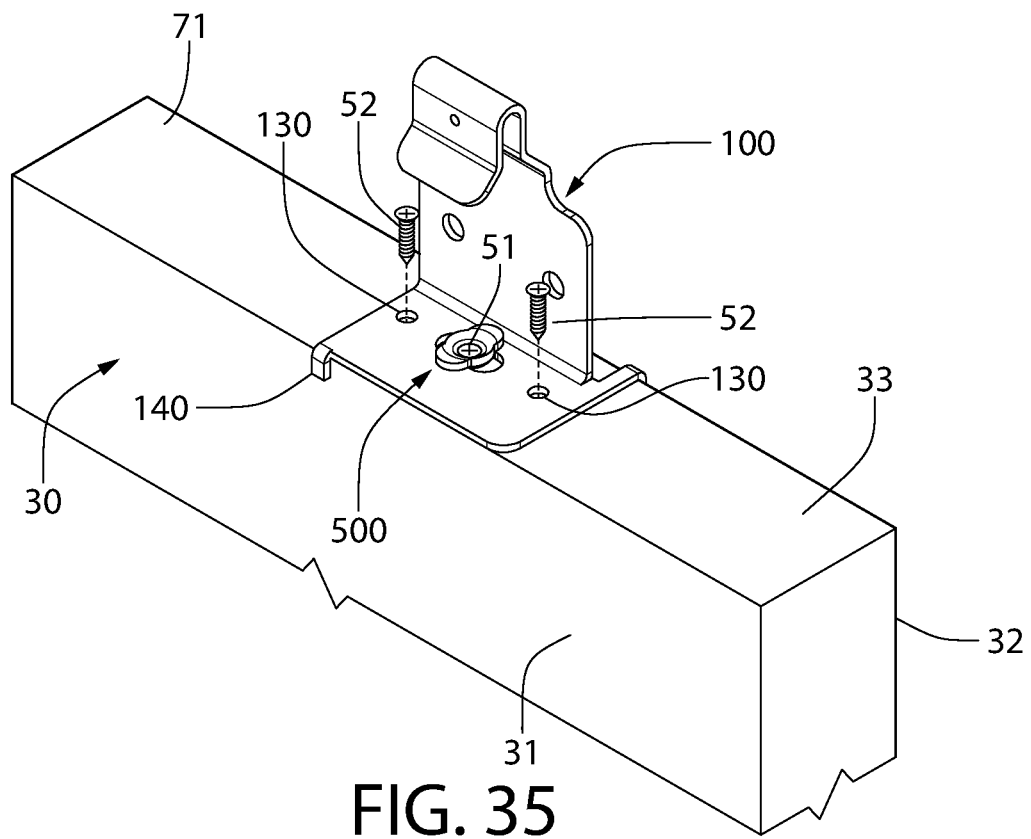

Immediately after the mounting tab 410 is inserted through the keyhole 120 of the mounting flange 110 and before any rotation (as shown in FIG. 35 before rotating about direction indicated through arrows), the third edge 116 and the fourth edge 117 of the mounting flange may not overlap with the upper surface 71 of the side surface 33 of the panel 30 along the Z-axis. Immediately after the mounting tab 410 is inserted through the keyhole 120 of the mounting flange, at least a portion of the first edge 114 and the second edge 115 may overlap with the upper surface 71 of the side surface 33 of the panel 30 along the Z-axis.

In a non-limiting embodiment, immediately after the mounting tab 410 is inserted through the keyhole 120 of the mounting flange 110 and before any rotation (as shown in FIG. 35 before rotating about direction indicated through arrows), a first alignment tab 140a may not be in contact with the second major surface 32 of the panel 30 and a second alignment tab 140b may not be in contact with the first major surface 31 of the panel 30. In such embodiment, the inner wall 144a of the vertical portion 144 of the first alignment tab 140a may not be in contact with the second major surface 32 of the panel 30 and the inner wall 144a of the vertical portion 144 of the second alignment tab 140b may not be in contact with the first major surface 31 of the panel 30.

Subsequently, the mounting clip 100 and the pre-assembled mountable panel 7 may be rotated relative to each other (rotation indicated by arrows in FIG. 29). During the rotation between the mounting clip 100 and the pre-assembled mounting panel 7, the position of the mounting key 400 and the panel 30 remain substantially immobile relative to each other. Stated otherwise, while the mounting clip 100 and the pre-assembled mountable panel 7 may be rotated relative to each other in a range of rotation ranging from about 1 degree to about 179 degrees—including all angles and sub-ranges there-between—the mounting key 400 and the panel 30 undergo substantially no relative rotation during this stage (the phrase "substantially no relative rotation" refers to a rotation less than 1 degree.

In some embodiments, the range of motion for the mounting clip 100 and the pre-assembled mountable panel 7 may range from about 5 degrees to about 175 degrees—including all angles and sub-ranges there-between. In some embodiments, the range of motion for the mounting clip 100 and the pre-assembled mountable panel 7 may be about 85 to about 95 degrees—including all angles and sub-ranges there-between. In some embodiments, the range of motion for the mounting clip 100 and the pre-assembled mountable panel 7 may be about 90 degrees.

Causing rotation of the pre-assembled mountable panel 7 relative to the mounting clip 100 results in the alignment tab 140 to ultimately contact the panel 30. In some embodiments, the relative rotation of the pre-assembled mountable panel 7 relative to the mounting clip 100 may cause the inner wall 144a of the vertical portion 144 of the alignment tab 140 to contact the first major surface 31 and/or the second major surface 32 of the panel 30. In some embodiments, the inner wall 143a of the horizontal portion 143 of the alignment tab 140 may contact the upper surface 71 of the side surface 33 of the panel 30. In some embodiments, the inner wall 144a of the vertical portion 144 of the alignment tab 140 may substantially parallel to the first major surface 31 and/or the second major surface 32 of the panel 30.

In a non-limiting embodiment, the relative rotation of the pre-assembled mountable panel 7 relative to the mounting clip 100 may cause the first alignment tab 140a to contact the second major surface 32 of the panel 30 and the second alignment tab 140b to contact with the first major surface 31 of the panel 30. In such embodiment, the inner wall 144a of the vertical portion 144 of the first alignment tab 140a may contact with the second major surface 32 of the panel 30 and the inner wall 144a of the vertical portion 144 of the second alignment tab 140b may contact with the first major surface 31 of the panel 30. In a non-limiting embodiment, the relative rotation of the pre-assembled mountable panel 7 relative to the mounting clip 100 may cause the first alignment tab 140a to contact the upper surface 71 of the side surface 33 of the panel 30. In such embodiment, the inner wall 143a of the horizontal portion 143 of the first alignment tab 140a may contact with the upper surface 71 of the side surface 33 of the panel 30.

Subsequently, at least one of the second fasteners 52 may be driven through the mounting hole 130 present on the mounting flange 110, thereby locking the mounting clip 100 into rotational and vertical place relative to the pre-assembled mountable panel 7.

After the relative rotation between the pre-assembled mountable panel 7 and the mounting clip 100 is complete, the mounting key 400 and the slot opening portion 140 of the keyhole 120 may not overlap along a direction parallel to the Z-axis. After the relative rotation between the pre-assembled mountable panel 7 and the mounting clip 100 is complete, the mounting tab 410 may only partially overlap with the keyhole 120 such that the transverse edges 416, 417 of the mounting key 400 and the top surface 111 of the mounting flange 110 may overlap along a direction parallel to the Z-axis. After the relative rotation between the pre-assembled mountable panel 7 and the mounting clip 100 is complete, the mounting tab 410 may only partially overlap with the keyhole 120 such that at least a portion the lower surface 412 of the mounting tab 410 and the top surface 111 of the mounting flange 110 may overlap along a direction parallel to the Z-axis.

Figure 36:
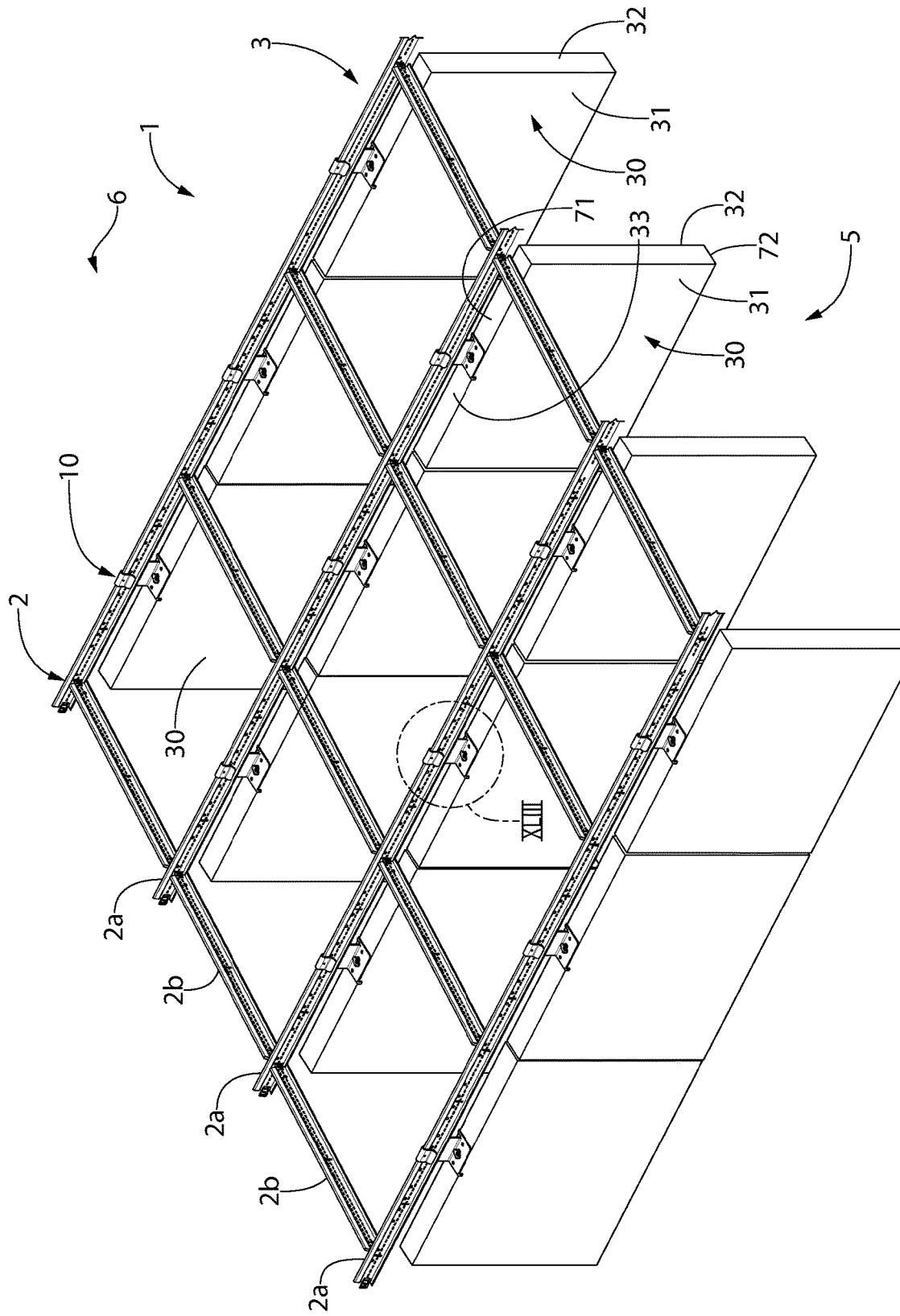
FIG. 36 is a ceiling system comprising a plurality of the panel assemblies.

Referring now to FIGS. 36 and 37, other embodiments of the present invention include a ceiling system 1 comprising at least one of the panel assembly 10 and at least one support member 2.

The ceiling system 1 may comprise a plurality of support members 2 such that a first plurality of support members 2a extend along a first longitudinal direction. The first plurality of support members 2a may be parallel to each other. The plurality of support members 2 may further include a second plurality of support members 2b that extend transverse to the first longitudinal direction. The combination of the first plurality of support members 2a and the second plurality of support members 2b for a ceiling support grid 3. An active room environment 5 may be located beneath the ceiling support grid 3 and a plenary space 6 may be located above the ceiling support grid 3.

The plenary space 6 provides space for mechanical lines within a building (e.g., HVAC, plumbing, etc.). The active space 5 provides room for the building occupants during normal intended use of the building (e.g., in an office building, the active space would be occupied by offices containing computers, lamps, etc.).

The at least one panel assembly 10 may be coupled to at least one of the support members 2. The at least one panel assembly 10 may be suspended from the support members 2 via the grid engagement member 180. The support member 2 may comprise an inverted T-bar 20 having a bottom flange 21 and a head portion 23. The grid engagement member 180 may couple to the head portion 23 of the support member 2.

In some embodiments, the grid engagement member 180 may include other features or other geometry, such as surface ridges or added material coatings to enhance engagement or gripping of the head portion 23 of the support member 20. In one embodiment, the rear arm 182 and the front arm 184 may be a predetermined length that allows them to move vertically upward while remaining partially engaged with the head 23 of the support strut 20. This partial engagement with head 23 allows the mounting clip 100 to move vertically during seismic conditions without becoming unengaged from the support grid 3. In one embodiment, the first offset portion 144 extends from and is connected at a lower end to an upper end of the positioning member 170, and connects at an upper end to the rear arm 181. The second offset portion 185 connects to and extends from the front arm 184 and assists in alignment of the grid engagement member 170 with the head portion 23. In one embodiment, the front arm 184 is substantially the same length as the rear arm 182. In one embodiment, the combined length of the front arm 184 and the second offset portion 185 is substantially less than or equal to the length of the rear arm 182 to provide a predetermined distance for moving the grid engagement member 170 to reach clearance from the head 23. In one embodiment, alternatively, the grid engagement member 170 does not include the second offset portion 185.

Once coupled to the support grid 3 via the mounting clip 100, the panel 30 may hang vertically within the ceiling system 1. The term "hang vertically" may refer to the first major surface 31 and the second major surface 32 of the panel 30 being arranged orthogonal to the plenary space 6 and/or active room environment 5. The term "hang vertically" may refer to the upper surface 71 of the side surface 33 of the panel 30 facing towards the plenary space 6 and the lower surface 72 of the side surface 33 of the panel facing the active room environment 5. The term "hang vertically" may refer to the first major surface 31 of a first one of the panel 30 facing toward the second major surface 32 of a second one of the panel 30.

Figure 39:
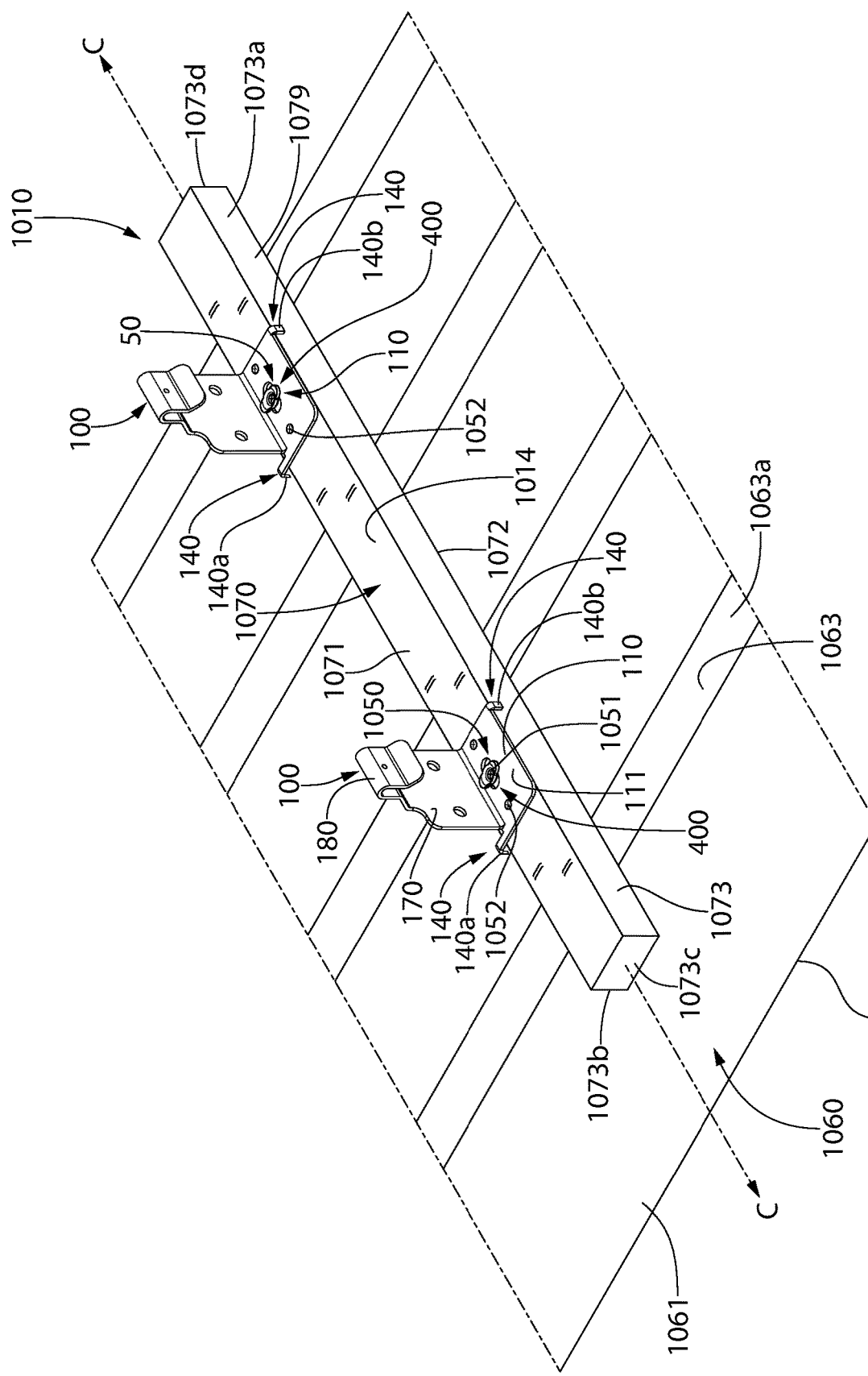
FIG. 39 is a close up of region XLIVB of the panel assembly of FIG. 38.
Figure 40:
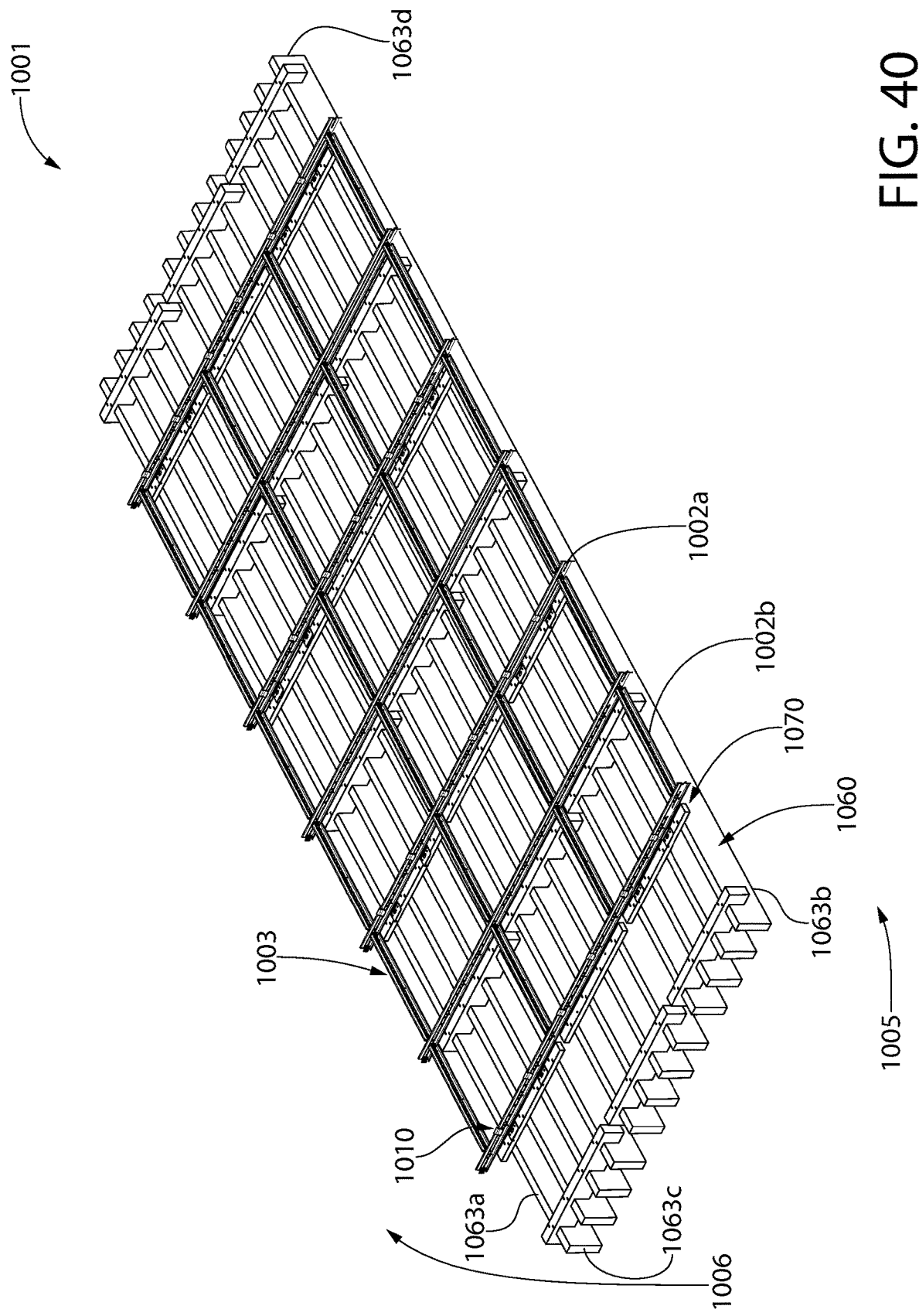
FIG. 40 is a ceiling system comprising the panel assembly of FIG. 38.

Referring now to FIGS. 38-40, a panel assembly 1010 and ceiling system 1001 are illustrated in accordance with another embodiment of the present invention. The panel assembly 1010 is similar to the panel assembly 10 except as described herein below. The ceiling system 1001 is similar to the ceiling system 1001 except as described herein below. The description of the panel assembly 10 above generally applies to the panel assembly 1010 described below except with regard to the differences specifically noted below. The description of the ceiling system 1 above generally applies to the ceiling system 1001 described below except with regard to the differences specifically noted below. A similar numbering scheme will be used for the panel assembly 1010 and the ceiling system 1001 as with the panel assembly 10 and ceiling system 1 except that the 1000-series of numbers will be used.

The panel assembly 1010 of this embodiment may also be referred to as a "slat assembly"—whereby the slat assembly 1010 and the ceiling system 1001 of this embodiment may comprise at least one of the mounting clip 100, 200 with the mounting key 400, 500 previously discussed—although the slat assembly 1010 and the ceiling panel 1001 of this embodiment will use a 1000-series numbering, the same numbering of the mounting clip 100, 200 and the mounting key 400, 500 will be used in the description of this embodiment.

The slat assembly 1010 may comprise at least one grill assembly 1040. The grill assembly 1040 may comprise a plurality of slats 1060 and at least one of a first cross member 1070. In some embodiments, the grill assembly 1040 may comprise a plurality of slats 1060 and at least one of a first cross member 1070 and at least one of a second cross member 1080.

Each one of the plurality of slats 1060 may comprise an elongated body 1065. Each one of the plurality of slats 1060 may comprise a first major surface 1061 opposite a second major surface 1062 and a side surface 1063 extending between the first major surface 1061 and the second major surface 1062. The side surface 1063 of each slat 1060 may comprise an upper side surface 1063a opposite a lower side surface 1063b and a first edge side surface 1063c opposite a second edge side surface 1063d. Each one of the slats 1060 may be positioned vertically such that the upper side surface 1063a faces the plenary space 1006 within the ceiling system 1001 and the lower side surface 1063b faces the active room environment 1005 within the ceiling system 1001. The first and second major surfaces 1061, 1062 of the plurality of slats 1060 may overlap along a horizontal direction within the ceiling system 1.

Each one of the plurality of slats 1060 may be elongated and extend along a first longitudinal axis B-B that intersects the first edge side surface 1063c and the second edge side surface 1063d. The upper side surface 1063a and the lower side surface 1063b may extend substantially parallel to the first longitudinal axis B-B. The first major surface 1061 and the second major surface 1062 of each slat 1060 may extend substantially parallel to the first longitudinal axis B-B.

Each one of the plurality of first cross members 1070 may comprise a first body 1079. Each one of the plurality of first cross members 1070 may comprise an upper surface 1071 opposite a lower surface 1072 and a side surface 1073 extending between the upper surface 1071 and the lower surface 1072 of the first cross member 1070.

The side surface 1073 of the first cross member 1070 may comprise a first elongated side surface 1073a opposite a second elongated side surface 1073b and a first transverse side surface 1073c opposite a second transverse side surface 1073d. Each one of the first cross members 1070 may be positioned substantially orthogonal to the plurality of stats 1060. The first cross member 1070 may be elongated and extend along a second longitudinal axis C-C that intersects the first transverse side surface 1073c and the second transverse side surface 1073d. The first elongated side surface 1073a and the second elongated side surface 1073b may extend substantially parallel to the second longitudinal axis C-C. The upper surface 1071 and the lower surface 1072 of the first cross member 1070 may extend substantially parallel to the second longitudinal axis C-C.

The upper surface 1071 of the first cross member 1070 may face the plenary space 1006 within the ceiling system 1001 and the lower surface 1072 may face the active room environment 1005 within the ceiling system 1001. The plurality of slats 1060 may be positioned beneath the first cross member 1070 such that upper surface 1071 of the first cross member 1070 faces away from the plurality of slats 1060 while the lower surface 1072 of the first cross member 1070 faces the side surface 1063 of the of the slats 1060. Specifically, the plurality of slats 1060 may be positioned beneath the first cross member 1070 such that upper surface 1071 of the first cross member 1070 faces away from the plurality of slats 1060 while the lower surface 1072 of the first cross member 1070 faces the upper side surface 1063a of the of the slats 1060. The lower surface 1072 of the first cross member 1070 may contact the upper side surface 1063a of the slats 1060.

The first cross member 1070 and the plurality of slats 1060 may be coupled together by one or more fasteners 1014. The plurality of slats 1060 and the first cross member 1070 may be arranged such that the first longitudinal axis B-B and the second longitudinal axis C-C are substantially orthogonal.

Each one of the plurality of second cross members 1080 may comprise a second body 1089. Each one of the plurality of second cross members 1080 may comprise an upper surface 1081 opposite a lower surface 1082 and a side surface 1083 extending between the upper surface 1081 and the lower surface 1082 of the second cross member 1080. The first cross member 1070 and the second cross member 1080 may be arranged in an alternative pattern along the first longitudinal axis B-B of the plurality of slats 1060.

According to this embodiment, the mounting clip 100, 200 may installed to, engage, and be coupled to the first cross member 1070 in a manner that is the same as to the mounting clip 100, 200 is installed to, engage, and be coupled to the panel 30 via the mounting key 400, 500, as previously discussed. Accordingly, the upper surface 71 of the panel 30 may be equated to the upper surface 1071 of the first cross member 1070, the body 39 of the panel 30 may be equated to the body 1079 of the first cross member 1070, the first major surface 31 of the panel 30 may be equated to the first elongated side surface 1073a of the first cross member 1070, and the second major surface 32 of the panel 30 may be equated to the second elongated side surface 1073b of the first cross member 1070.

In a non-limiting embodiment of the slat assembly 1010, the bottom surface 112 of the mounting flange 110 may be adjacent the upper surface 1071 of the first cross member 1070. In some embodiments, the bottom surface 112 of the mounting flange 110 may contact the upper surface 1071 of the first cross member 1070.

In the slat assembly 1010, at least one alignment tab 140 of the mounting clip 100 may be adjacent to one of the first elongated side surface 1073a or the second elongated side surface 1073b of the first cross member 1070. In some embodiments, the at least one alignment tab 140 of the mounting clip 100 may be in contact with one of the first elongated side surface 1073a or the second elongated side surface 1073b of the first cross member 1070.

In the slat assembly 1010, the vertical portion 144 of at least one alignment tab 140 of the mounting clip 100 may be adjacent to one of the first elongated side surface 1073a or the second elongated side surface 1073b of the first cross member 1070. In some embodiments, the vertical portion 144 at least one alignment tab 140 of the mounting clip 100 may be in contact with one of the first elongated side surface 1073a or the second elongated side surface 1073b of the first cross member 1070.

In the panel assembly 10, the inner wall 144a of the vertical portion 144 of at least one alignment tab 140 of the mounting clip 100 may be adjacent to one of the first elongated side surface 1073a or the second elongated side surface 1073b of the first cross member 1070. In some embodiments, the inner wall 144a of the vertical portion 144 at least one alignment tab 140 of the mounting clip 100 may be in contact with one of the first elongated side surface 1073a or the second elongated side surface 1073b of the first cross member 1070.

In the panel assembly 10, at least one alignment tab 140 of the mounting clip 100 may be adjacent to the upper surface 1071 of the first cross member 1070. In some embodiments, the at least one alignment tab 140 of the mounting clip 100 may be contact with the upper surface 1071 of the first cross member 1070.

In the panel assembly 10, the horizontal portion 143 of at least one alignment tab 140 of the mounting clip 100 may be adjacent to the upper surface 1071 of the first cross member 1070. In some embodiments, the horizontal portion 143 of at least one alignment tab 140 of the mounting clip 100 may be in contact with the upper surface 1071 of the first cross member 1070.

In the panel assembly 10, the inner wall 143a of the horizontal portion 143 of at least one alignment tab 140 of the mounting clip 100 may be adjacent to the upper surface 1071 of the first cross member 1070. In some embodiments, the inner wall 143a of the horizontal portion 143 at least one alignment tab 140 of the mounting clip 100 may be in contact with the upper surface 1071 of the first cross member 1070.

In a non-limiting embodiment, the panel assembly 10 comprising the mounting clip 100 having a first alignment tab 140a and a second alignment tab 140b may comprise the first alignment tab 140a located adjacent to the second elongated side surface 1073b and the second alignment tab 140b located adjacent to the first elongated side surface 1073a of the first cross member 1070. The first alignment tab 140a may be partially located adjacent to the upper surface 1071 of the first cross member 1070.

In such embodiment, the vertical portion 144 of the first alignment tab 140a may be located adjacent to the second elongated side surface 1073b of the first cross member 1070 and the vertical portion 144 of the second alignment tab 140b located adjacent to the first elongated side surface 1073a of the first cross member 1070. The horizontal portion 143 of the first alignment tab 140a may also be partially located adjacent to the upper surface 1071 of the first cross member 1070. In such embodiment, the vertical portion 144 of the first alignment tab 140a may contact the second elongated side surface 1073b of the first cross member 1070. The vertical portion 144 of the second alignment tab 140b may contact the first elongated side surface 1073a of the first cross member 1070. The horizontal portion 143 of the first alignment tab 140a may contact the upper surface 1071 of the first cross member 1070.

In such embodiment, the inner wall 144a of the vertical portion 144 of the first alignment tab 140a may be located adjacent to the second elongated side surface 1073b of the first cross member 1070 and the inner wall 144a of the vertical portion 144 of the second alignment tab 140b located adjacent to the first elongated side surface 1073a of the first cross member 1070. The inner wall 143a of the horizontal portion 143 of the first alignment tab 140a may be partially located adjacent to the upper surface 1071 of the first cross member 1070. In such embodiment, the inner wall 144a of the vertical portion 144 of the first alignment tab 140*a* may contact the second elongated side surface 1073*b* of the first cross member 1070. The inner wall 144*a* of the vertical portion 144 of the second alignment tab 140*b* may contact to the first elongated side surface 1073*a* of the first cross member 1070. The inner wall 143*a* of the horizontal portion 143 of the first alignment tab 140*a* may contact the upper surface 1071 of the first cross member 1070.

The lower surface 452 of the mounting spacer 450 may contact the upper surface 1071 of the first cross member 1070. The slat assembly 1010 may comprise one or more fasteners 1050. A first fastener 1051 may extend through the through-hole 420 of the mounting tab 410 and the through-hole 460 of the mounting spacer 450 and into the body 1079 of the first cross member 1070, thereby securing the mounting key 400 to the first cross member 1070.

The slat assembly 1010 may comprise a second fastener 1052 that may extend through the mounting hole 130 present on the mounting flange 110 thereby securing the mounting clip 100 to the first cross member 1070. The second fastener 1052 may extend through the mounting hole 130 present on the mounting flange 110 and into the upper surface 1071 of the first cross member 1070, thereby securing the mounting clip 100 to the first cross member 1070.

The head of the first fastener 1051 may be located above the upper surface 1071 of the first cross-member 1070. The shaft of the first fastener 1051 may overlap with the body 1079 of the first cross member 1070 along the X-axis and the Y-axis. The head 50 of the second fastener 1052 may be located above the upper surface 1071 of the first cross member 1070. The shaft of the second fastener 1052 may overlap with the body 1079 of the first cross member 1070 along the X-axis and the Y-axis.

The slat assembly 1010 may be assembled according to the previously discussed steps except that the first cross member 1070 is substitute for the panel 30. Specifically, a pre-assembled mountable grill assembly 1007 may comprise at least one grill assembly 1040, at least one first cross member 1070, and at least one mounting key 400 coupled to the first cross member 1070 by fastener 50. The pre-assembled mountable grill assembly 1007 may be factory-formed (i.e., comes as a pre-assembled unit that does not require assembly in the field at the time of installation). Such factory-formed mountable grill assembly 1007 may ensure precise location and spacing of the mounting clip 100 on the panel assembly 10.

The mounting key 400 may be coupled to the first cross member 1070 such that the first transverse edge 416 is adjacent to the first elongated side surface 1073*a* of the first cross member 1070 and the second transverse edge 417 is adjacent to the second elongated side surface 1073*b* of the first cross member 1070.

The mounting clip 100 may be then be aligned with the pre-assembled mountable grill assembly 1007 such that the mounting key 400 and the keyhole 120 of the mounting clip substantially 100 overlap. Specifically, the mounting clip 100 may be oriented relative to pre-assembled mountable grill assembly 1007 such that the transverse edges 416, 417 of the mounting tab 410 overlap with the slot opening portion 124 of the keyhole 120 along the Z-axis.

Subsequently pre-assembled mountable grill assembly 1007 and the mounting clip 100 may be brought together in a direction substantially parallel to the Z-axis such that the mounting tab 410 of the mounting key 400 on the pre-assembled mountable grill assembly 1007 enters and passes through the keyhole 120. The pre-assembled mountable grill assembly 1007 and the mounting clip 100 may be brought together in a direction substantially parallel to the Z-axis such that the mounting tab 410 of the mounting key 400 passes the bottom surface 112 of the mounting flange, passes the keyhole wall 121 of the keyhole 120 and exits the keyhole 120 passing the top surface 111 of the mounting flange 110 of the mounting clip 100.

As the mounting clip 100 and the pre-assembled mountable grill assembly 1007 are brought together in a direction along the Z-axis, and once the mounting tab 410 passes through the keyhole 120, the mounting spacer 450 may subsequently enter the keyhole 120. The mounting clip 100 and the pre-assembled mountable panel 7 may continue to move relative to each other along the Z-axis until the bottom surface 112 of the mounting flange 110 contacts the upper surface 1071 of the first cross member 1070.

Immediately after the mounting tab 410 is inserted through the keyhole 120 of the mounting flange and before any rotation (similar to the motion shown in FIG. 35 before rotating about direction indicated through arrows), the at least one alignment tab 140 may not be in contact with the first cross member 1070. In some embodiments, the inner wall 144*a* of the vertical portion 144 of the alignment tab 140 may not be in contact with the first elongated side surface 1073*a* or the second elongated side surface 1073*b* of the first cross member 1070. In some embodiments, the inner wall 143*a* of the horizontal portion 143 of the alignment tab 140 may not be in contact with the upper surface 1071 of the first cross member 1070. In some embodiments, the inner wall 144*a* of the vertical portion 144 of the alignment tab 140 may not be parallel to the first elongated side surface 1073*a* or the second elongated side surface 1073*b* of the first cross member 1070.

Immediately after the mounting tab 410 is inserted through the keyhole 120 of the mounting flange 110 and before any rotation, the third edge 116 and the fourth edge 117 of the mounting flange may not overlap with the upper surface 1071 of the first cross member 1070 along the Z-axis. Immediately after the mounting tab 410 is inserted through the keyhole 120 of the mounting flange, at least a portion of the first edge 114 and the second edge 115 may overlap with the upper surface 1071 of the first cross member 1070 along the Z-axis.

In a non-limiting embodiment, immediately after the mounting tab 410 is inserted through the keyhole 120 of the mounting flange 110 and before any rotation, a first alignment tab 140*a* may not be in contact with the second elongated side surface 1073*b* and a second alignment tab 140*b* may not be in contact with the first elongated side surface 1073*a* of the first cross member 1070. In such embodiment, the inner wall 144*a* of the vertical portion 144 of the first alignment tab 140*a* may not be in contact with the second elongated side surface 1073*b* of first cross member 1070 and the inner wall 144*a* of the vertical portion 144 of the second alignment tab 140*b* may not be in contact with the first elongated side surface 1073*a* of the first cross member 1070.

Subsequently, the mounting clip 100 and the pre-assembled mountable grill assembly 1007 may be rotated relative to each other (similar to the rotation indicated by arrows in FIG. 35 for that embodiment). During the rotation between the mounting clip 100 and the pre-assembled mountable grill assembly 1007, the position of the mounting key 400 and the first cross member 1070 remain substantially immobile relative to each other. Stated otherwise, while the mounting clip 100 and the pre-assembled mountable grill assembly 1007 may be rotated relative to each other in a range of rotation ranging from about 1 degree to about 179 degrees—including all angles and sub-ranges there-between—the mounting key 400 and the first cross member 1070 undergo substantially no relative rotation during this stage.

In some embodiments, the range of motion for the mounting clip 100 and the pre-assembled mountable grill assembly 1007 may range from about 5 degrees to about 175 degrees—including all angles and sub-ranges there-between. In some embodiments, the range of motion for the mounting clip 100 and the pre-assembled mountable grill assembly 1007 may be about 85 to about 95 degrees—including all angles and sub-ranges there-between. In some embodiments, the range of motion for the mounting clip 100 and the pre-assembled mountable grill assembly 1007 may be about 90 degrees.

Causing rotation of the pre-assembled mountable grill assembly 1007 relative to the mounting clip 100 results in the alignment tab 140 to ultimately contact the first cross member 1070. In some embodiments, the relative rotation of the pre-assembled mountable grill assembly 1007 relative to the mounting clip 100 may cause the inner wall 144*a* of the vertical portion 144 of the alignment tab 140 to contact the first elongated side surface 1073*a* and/or the second elongated side surface 1073*b* of the first cross member 1070. In some embodiments, the inner wall 143*a* of the horizontal portion 143 of the alignment tab 140 may contact the upper surface 1071 of the first cross member 1070. In some embodiments, the inner wall 144*a* of the vertical portion 144 of the alignment tab 140 may substantially parallel to the first elongated side surface 1073*a* and/or the second elongated side surface 1073*b* of the first cross member 1070.

In a non-limiting embodiment, the relative rotation of the pre-assembled mountable grill assembly 1007 relative to the mounting clip 100 may cause the first alignment tab 140*a* to contact the second elongated side surface 1073*b* of the first cross member 1070 and the second alignment tab 140*b* to contact with the first elongated side surface 1073*a* of the first cross member 1070. In such embodiment, the inner wall 144*a* of the vertical portion 144 of the first alignment tab 140*a* may contact with the second elongated side surface 1073*b* of the first cross member 1070 and the inner wall 144*a* of the vertical portion 144 of the second alignment tab 140*b* may contact with the first elongated side surface 1073*a* of the first cross member 1070. In a non-limiting embodiment, the relative rotation of the pre-assembled mountable grill assembly 1007 relative to the mounting clip 100 may cause the first alignment tab 140*a* to contact the upper surface 1071 of the first cross member 1070. In such embodiment, the inner wall 143*a* of the horizontal portion 143 of the first alignment tab 140*a* may contact with the upper surface 1071 of the first cross member 1070.

Subsequently, at least one of the second fasteners 52 may be driven through the mounting hole 130 present on the mounting flange 110, thereby locking the mounting clip 100 into rotational and While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. A mounting clip comprising:
   a mounting flange comprising a top surface opposite a bottom surface and a perimeter extending between the top surface and the bottom surface;
   a positioning member extending upwards from the mounting flange;
   a grid engagement member extending upwards from the positioning member;
   a first alignment tab extending downward from the mounting flange; and
   wherein the mounting flange comprises a keyhole located inset from the perimeter of the mounting flange and extending continuously from the top surface to the bottom surface of the mounting flange.

2. The mounting clip according to claim 1, wherein the first alignment tab comprises a first distal end located below the bottom surface of the mounting flange by a first tab distance, the first tab distance being a non-zero positive value.

3. The mounting clip according to claim 1, wherein the perimeter of the mounting flange comprises a first edge opposite a second edge and a third edge opposite a fourth edge, wherein the positioning member is adjacent to the first edge.

4. The mounting clip according to claim 1, further comprising a second alignment tab extending downward from the mounting flange.

5. The mounting clip according to claim 4, wherein the second alignment tab comprises a second distal end located below the bottom surface of the mounting flange by a second tab distance, the second tab distance being a non-zero positive value.

6. The mounting clip according to claim 5, wherein the second alignment tab is located adjacent to the second edge and fourth edge of the perimeter of the mounting flange.

7. The mounting clip according to claim 4, wherein the first alignment tab is located adjacent to the first edge and third edge of the perimeter of the mounting flange.

8. A mounting clip comprising:
   a mounting flange comprising:
      a top surface;
      a bottom surface that is opposite the top surface;
      a perimeter extending between the top surface and the bottom surface;
      a keyhole located inset from the perimeter of the mounting flange and extending continuously from the top surface to the bottom surface of the mounting flange;
   a first alignment tab extending downward from the mounting flange;
   a second alignment tab extending downward from the mounting flange;

a first axis extending through the keyhole in a direction that is orthogonal to the bottom surface of the mounting flange; and wherein the first alignment tab and the second alignment tab are positioned about the first axis and offset by about 180 degrees as measured about the first axis.

9. The mounting clip according to claim 8, wherein the first alignment tab comprises a first distal end located below the bottom surface of the mounting flange by a first tab distance, the first tab distance being a non-zero positive value.

10. The mounting clip according to claim 8, wherein the second alignment tab comprises a second distal end located below the bottom surface of the mounting flange by a second distance, the second tab distance being a non-zero positive value.

11. The mounting clip according to claim 8, wherein the first alignment tab comprise a first inner wall opposite a first outer wall, and the second alignment tab comprises a second inner wall opposite a second outer wall, wherein the first inner wall and the second inner wall are substantially parallel.

12. The mounting clip according to claim 8, wherein the first inner wall of the first alignment tab is offset from the second inner wall of the second alignment tab by about 180 degrees about the first axis.

13. The mounting clip according to claim 8, wherein the first axis extends through the keyhole but is not centered on the keyhole.

14. The mounting clip according to claim 8, wherein the perimeter of the mounting flange comprises a first edge opposite a second edge and a third edge opposite a fourth edge, wherein the positioning member is adjacent to the first edge.

15. The mounting clip according to claim 14, wherein an X-axis intersects the first edge and the second edge of the perimeter of the mounting flange, a Y-axis intersects the third edge and the fourth edge of the perimeter of the mounting flange, and a Z-axis intersects the top surface and the bottom surface of the mounting flange.

16. The mounting clip according to claim 15, wherein the first alignment tab and the second alignment tab are horizontally offset from each other by a first tab offset distance as measured along the X-axis, and the first alignment tab and the second alignment tab are horizontally offset from each other by a second tab offset distance as measured along the Y-axis.

17. The mounting clip according to claim 16, wherein a ratio of the first tab offset distance to the second tab offset distance ranges from about 0.35:1 to about 0.95:1.

18. A panel assembly comprising
a panel comprising a body and having a first major surface opposite a second major surface and a side surface extending there-between;
at least one mounting clip comprising:
  a mounting flange comprising:
    a top surface opposite a bottom surface and a perimeter extending between the top surface and the bottom surface;
    a keyhole located inset from the perimeter of the mounting flange and extending continuously from the top surface to the bottom surface of the mounting flange;
  a positioning member extending upwards from the mounting flange;
  a grid engagement member extending upwards from the positioning member;
  a first alignment tab extending downward from the mounting flange; and
at least one mounting key comprising:
  a mounting tab; and
  a mounting spacer; and
wherein the first alignment tab of the mounting clip is located adjacent to the first major surface of the panel;
wherein the lower surface of the mounting flange is located is adjacent to the side surface of the panel;
wherein the mounting spacer of the mounting key is located at least partially within the keyhole of the mounting flange; and
wherein the mounting tab of the mounting key is located adjacent to the top surface of the mounting flange.

19. The panel assembly according to claim 18, the mounting clip further comprises a second alignment tab extending downward from the mounting flange, and wherein the second alignment tab is located adjacent to the second major surface of the panel.

20. The panel assembly according to claim 18, wherein the mounting tab comprises an upper surface opposite a lower surface, and wherein the lower surface of the mounting tab at least partially overlaps with the top surface of the mounting flange in a vertical direction.

* * * * *